(12) United States Patent
Matsukura

(10) Patent No.: US 8,884,509 B2
(45) Date of Patent: Nov. 11, 2014

(54) OPTICAL DEVICE, DISPLAY DEVICE, AND LIGHTING DEVICE

(75) Inventor: Hideki Matsukura, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 313 days.

(21) Appl. No.: 13/406,816

(22) Filed: Feb. 28, 2012

(65) Prior Publication Data

US 2012/0223979 A1 Sep. 6, 2012

(30) Foreign Application Priority Data

Mar. 2, 2011 (JP) ................ 2011-044741

(51) Int. Cl.
| | |
|---|---|
| *H01L 51/50* | (2006.01) |
| *H01L 51/52* | (2006.01) |
| *H01J 1/62* | (2006.01) |
| *H01J 63/04* | (2006.01) |
| *G02B 5/22* | (2006.01) |
| *G02B 5/20* | (2006.01) |

(52) U.S. Cl.
CPC ............. *G02B 5/201* (2013.01); *G02B 5/223* (2013.01)
USPC ........................ 313/501; 313/506; 313/512

(58) Field of Classification Search
CPC ............. H01L 27/322; H01L 27/3211; H01L 27/1218; H01L 2251/5315; H01L 51/5237; H01L 51/5284; H01L 51/5281; H01L 33/502; H01L 33/507; H01L 33/50; H01L 33/501; H01L 33/58; H01L 33/504; H01L 33/508; H01L 27/3244; H01L 27/3276; G02F 1/133514; G02B 5/201; H01J 61/40; H01J 61/35; H01J 11/44; H01J 61/38; H01K 1/32; F21S 10/02; F21V 9/08; F21V 9/00; F21V 9/10

See application file for complete search history.

(56) References Cited

U.S. PATENT DOCUMENTS

| | | | |
|---|---|---|---|
| 4,580,159 A * | 4/1986 | Manabe ................. | 348/273 |
| 5,948,576 A | 9/1999 | Shirota et al. | |
| 6,084,650 A | 7/2000 | Sekiguchi | |
| 6,134,059 A | 10/2000 | Shirota et al. | |
| 6,207,329 B1 | 3/2001 | Shirota et al. | |
| 6,445,005 B1 | 9/2002 | Yamazaki et al. | |
| 6,529,255 B1 | 3/2003 | Sekiguchi | |
| 6,593,691 B2 | 7/2003 | Nishi et al. | |
| 6,624,861 B2 | 9/2003 | Miyakawa et al. | |
| 6,784,457 B2 | 8/2004 | Yamazaki et al. | |

(Continued)

FOREIGN PATENT DOCUMENTS

| | | |
|---|---|---|
| EP | 0 665 449 A1 | 8/1995 |
| EP | 1 154 305 A1 | 11/2001 |

(Continued)

*Primary Examiner* — Nimeshkumar Patel
*Assistant Examiner* — Jose M Diaz
(74) *Attorney, Agent, or Firm* — Nixon Peabody LLP; Jeffrey L. Costellia

(57) ABSTRACT

A structure with which luminance of light extracted outside is improved in the case where a color filter is used is disclosed below. In an optical device including an optical element and a color conversion unit which light radiated from the optical element (light emitted from the optical element or light passing through the optical element) enters, the color conversion unit has a color filter region in which a color filter layer is provided and a transmissive region having higher transmittance per unit area than the color filter region.

14 Claims, 31 Drawing Sheets

(56) References Cited

U.S. PATENT DOCUMENTS

| | | | |
|---|---|---|---|
| 6,819,374 B2* | 11/2004 | Sekiguchi | 349/106 |
| 6,894,312 B2 | 5/2005 | Yamazaki et al. | |
| 6,933,520 B2 | 8/2005 | Yamazaki | |
| 7,397,180 B2 | 7/2008 | Yamazaki | |
| 7,518,146 B2 | 4/2009 | Yamazaki et al. | |
| 7,541,734 B2 | 6/2009 | Yamazaki et al. | |
| 7,738,050 B2 | 6/2010 | Yamazaki et al. | |
| 7,952,103 B2 | 5/2011 | Yamazaki et al. | |
| 7,986,087 B2* | 7/2011 | Asano et al. | 313/501 |
| 8,111,362 B2 | 2/2012 | Yamazaki et al. | |
| 8,304,265 B2* | 11/2012 | Nakamura et al. | 438/29 |
| 8,405,063 B2* | 3/2013 | Kazlas et al. | 257/9 |
| 2004/0023567 A1* | 2/2004 | Koyama et al. | 439/894 |
| 2006/0038752 A1* | 2/2006 | Winters | 345/76 |
| 2007/0159043 A1* | 7/2007 | Kubota et al. | 313/110 |
| 2007/0200492 A1* | 8/2007 | Cok et al. | 313/506 |
| 2007/0275624 A1* | 11/2007 | Kawaguchi et al. | 445/24 |
| 2008/0001528 A1* | 1/2008 | Eida | 313/501 |
| 2008/0224595 A1* | 9/2008 | Nakamata et al. | 313/500 |
| 2009/0195152 A1* | 8/2009 | Sawano | 313/504 |
| 2010/0245898 A1* | 9/2010 | Nakai et al. | 358/1.15 |
| 2011/0042697 A1* | 2/2011 | Lee et al. | 257/89 |
| 2011/0221741 A1* | 9/2011 | Kawamura et al. | 345/214 |
| 2011/0227088 A1 | 9/2011 | Yamazaki et al. | |
| 2011/0298361 A1* | 12/2011 | Matsunaga et al. | 313/504 |

FOREIGN PATENT DOCUMENTS

| | | |
|---|---|---|
| JP | 07-253510 | 10/1995 |
| JP | 2001-217072 | 8/2001 |
| JP | 2001-305333 | 10/2001 |
| JP | 2003-186005 | 7/2003 |

* cited by examiner

OPTICAL DEVICE, DISPLAY DEVICE, AND LIGHTING DEVICE

BACKGROUND OF THE INVENTION

1. Field of the Invention

The technical field of the present invention relates optical devices (e.g., a display device, a lighting device, and the like).

In this specification, an optical device means a device having an optical element.

Further, examples of an optical element include, for example, a light-emitting element which emits light by application of current or voltage, an electro-optic element utilizing an electro-optic effect, an electrophoretic element utilizing an electrophoresis phenomenon, and the like.

That is, in this specification, an optical element means an element which is optically changed by the influence of current, voltage, an electric field, and the like Further, a display device is a device having a display element. Examples of the display device include an EL display device having an EL element (electroluminescence element), an electro-optic device having an electro-optic element, an electrophoretic display device having an electrophoretic element, and the like.

Further, a light-emitting device is a device having a light-emitting element which emits light by application of current or voltage. Examples of the light-emitting device include an EL display device, a lighting device, and the like.

That is, an EL display device is included in both a display device and a light-emitting device.

Further, an EL display device is a display device having an EL element (electroluminescence element). Examples of the EL display device include an organic EL display device having and organic EL element, an inorganic EL display device having an inorganic EL element, and the like.

Further, a lighting device is one of devices having a light-emitting element. Examples of the lighting device include an organic EL lighting device having an organic EL element, an inorganic EL lighting device having an inorganic EL element, an LED lighting device having an LED element, and the like.

Further, an electro-optic device is a device having an electro-optic element utilizing an electro-optic effect. Examples of the electro-optic device include a liquid crystal display device having a liquid crystal element, an electrochromic display device having an electrochromic element, and the like.

Furthermore, an electrophoretic display device is a device having an electrophoretic element utilizing an electrophoresis phenomenon. Examples of the electrophoresis display device include a microcapsule-type electrophoretic display device including a microcapsule-type electrophoretic element.

Note that examples of the display device include a display, a projector, and the like.

2. Description of the Related Art

An EL display device using a color filter is disclosed in Patent Document 1.

REFERENCE

[Patent Document 1] Japanese Published Patent Application No. 2001-217072

SUMMARY OF THE INVENTION

The color of light can be easily converted using a color filter; however, there is a problem in that luminance of light extracted outside is lowered when the light passes through the color filter.

In view of the above problem, a first object is to disclose a structure with which luminance of light extracted outside is improved in the case where a color filter is used below.

Further, a second object is to disclose a novel lighting device.

Note that the invention to be disclosed below achieves at least one of the first object and the second object.

An example of the invention to achieve the first object is an optical device including an optical element and a color conversion unit which light radiated from the optical element (light emitted from the optical element or light passing through the optical element) enters. In the optical device, the color conversion unit has a color filter region in which a color filter layer is provided and a transmissive region having higher transmittance per unit area than the color filter region.

That is, light passing through the transmissive region has higher luminance than light passing through the color filter region; thus, luminance of the light passing through the color filter can be compensated by that of the light passing through the transmissive region, whereby luminance of light extracted outside can be improved.

An example of the invention to achieve the second object is a lighting device provided with a color filter.

By the provision of a color filter a lighting device with which a desired color is expressed using a material with high luminance or a material with high reliability that does not easily deteriorate can be provided.

An optical device including an optical element and a color conversion unit, in which the color conversion unit is provided in a position which light radiated from the optical element enters, and the color conversion unit has a color filter region and a transmissive region, can be provided.

The optical device in which the color conversion unit includes a color filter and an insulating film covering the color filter can be provided.

The optical device in which the color conversion unit includes an insulating film provided in the transmissive region and a color filter covering the insulating film, the color filter is formed using an organic material, and the color filter is provided both in the transmissive region and the color filter region, can be provided.

The optical device in which the color filter includes a first plurality of light scattering particles can be provided.

The optical device in which the insulating film includes a second plurality of light scattering particles can be provided.

The optical device in which the color filter region includes at least a first plurality of light region and the first ring-like region is provided in a position overlapping with an end portion of the optical element can be provided.

The optical device in which the transmissive region includes a second ring-like region and the second ring-like region is provided adjacent to the inner side of the first ring-like region can be provided.

A display device including a first display element, a second display element, a first color conversion unit, and a second color conversion unit can be provided. In the display device, the first color conversion unit is provided in a position which light radiated from the first display element enters; the second color conversion unit is provided in a position which light radiated from the second display element enters; the first color conversion unit has a first color filter region and a first transmissive region; the second color conversion unit has a second color filter region and a second transmissive region; transmittance per unit area of the first color filter region is lower than that of the second color filter region; and the area of the first transmissive region is larger than that of the second transmissive region.

The display device in which the first and second color conversion units each include a color filter and an insulating film covering the color filter can be provided.

The display device in which the first and second color conversion units each include an insulating film provided in the transmissive region and a color filter covering the insulating film, the color filter is formed using an organic material, and the color filter is provided both in the transmissive region and the color filter region, can be provided.

The display device in which the color filter includes a first plurality of light scattering particles can be provided.

The display device in which the insulating film includes a second plurality of light scattering particles can be provided.

The display device in which the color filter region includes at least a first ring-like region and the first ring-like region, is provided in a position overlapping with an end portion of the display element can be provided.

The display device in which the transmissive region includes a second ring-like region and the second ring-like region is provided adjacent to the inner side of the first ring-like region.

A display device including a first display element, a second display element, a third display element a first color conversion unit, a second color conversion unit, and a third color conversion unit can be provided. In the display device, the first color conversion unit is provided in a position which light radiated from the first display element enters; the second color conversion unit is provided in a position which light radiated from the second display element enters; the third color conversion unit is provided in a position which light radiated from the third display element enters; the first color conversion unit includes a first color filter region and a first transmissive region; the second color conversion unit includes a second color filter region and a second transmissive region; the third color conversion unit includes a third color filter region and a third transmissive region; transmittance per unit area of the first color filter region is lower than that of the second color filter region; transmittance per unit area of the second color filter region is lower than that of the third color filter region; the area of the first transmissive region is larger than that of the second transmissive region; and the area of the second transmissive region is larger than that of the third transmissive region.

The display device in which the first to third color conversion units each include a color filter and an insulating film covering the color filter can be provided.

The display device in which the first to third color conversion units each include an insulating film provided in the transmissive region and a color filter covering the insulating film, the color filter is formed using an organic material, and the color filter is provided both in the transmissive region and the color filter region, can be provided.

The display device in which the color filter includes a first plurality of light scattering particles can be provided.

The display device in which the second insulating film includes a second plurality of light scattering particles can be provided.

The display device in which the color filter region has at least a first ring-like region and the first ring-like region is provided in a position overlapping with an end portion of the display element can be provided.

The display device in which the transmissive region has a second ring-like region and the second ring-like region is provided adjacent to the inner side of the first ring-like region can be provided.

The display device in which a green color filter is be provided to the first color filter region can be provided.

A lighting device including a light-emitting element and a color conversion unit, in which the color conversion unit is provided in a position which light radiated from the light-emitting element enters, can be provided.

The lighting device in which an emission color of the light-emitting element and a color of the conversion material are similar colors can be provided.

The lighting device in which the emission color of the light-emitting element is different from the color of the color conversion unit can be provided.

The lighting device in which the emission color of the light-emitting element and the color of the color conversion unit are in a relation of complementary colors can be provided.

The lighting device in which the color conversion unit has a color filter region and a transmissive region can be provided.

The lighting device in which the color conversion unit includes a color filter and an insulating film covering the color filter can be provided.

The lighting device in which the color conversion unit includes an insulating film provided in the transmissive region and a color filter covering the insulating film, the color filter is formed using an organic material, and the color filter is provided both in the transmissive region and the color filter region, can be provided.

The lighting device in which the color filter includes a first plurality of light scattering particles can be provided.

The lighting device in which the insulating film includes a second plurality of light scattering particles can be provided.

The lighting device in which the color filter region has at least a first ring-like region and the first ring-like region is provided in a position overlapping with an end portion of the optical element can be provided.

The lighting device in which the transmissive region has a second ring-like region and the second ring-like region is provided adjacent to the inner side of the first ring-like region can be provided.

The color conversion unit is provided with a color filter region and a transmissive region, whereby luminance of light extracted outside can be improved.

That is, luminance of light passing through the color filter is compensated by that of light passing through the transmissive region, whereby luminance of light extracted outside is improved.

By the provision of a color filter, a lighting device with which a desired color is expressed using a material with high luminance or a material with high reliability that does not easily deteriorate can be provided.

BRIEF DESCRIPTION OF THE DRAWINGS

FIGS. 7A to 7C illustrate examples of methods for manufacturing color conversion units.

DETAILED DESCRIPTION OF THE INVENTION

Figure 1A:
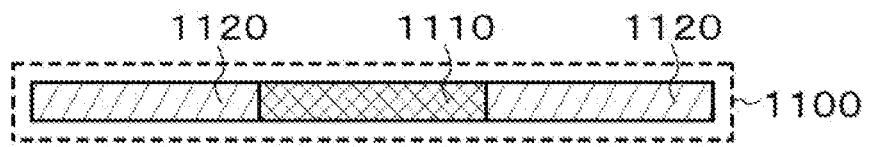
FIGS. 1A to 1C each illustrate an example of an optical device.
Figure 1A:
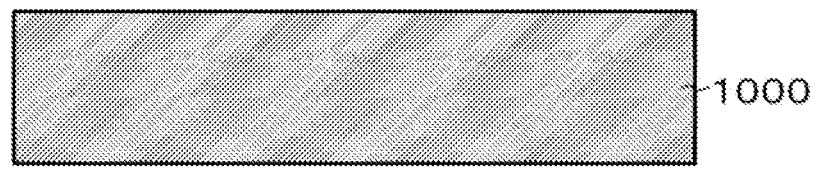

Embodiments will be described in detail with reference to the drawings

It is easily understood by those skilled in the art that modes and details thereof can be modified in various ways without departing from the spirit and scope of the present invention. Therefore, the present invention should not be interpreted as being limited to what is described in the embodiments described below.

In the structures to be given below, the same portions or portions having similar functions are denoted by the same reference numerals in different drawings, and explanation thereof will not be repeated.

The following embodiments can be combined with each other, as appropriate.

Embodiment 1

Figure 1B:
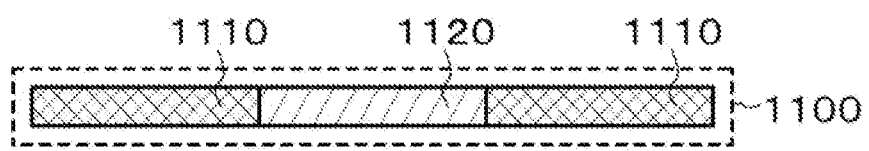
Figure 1B:
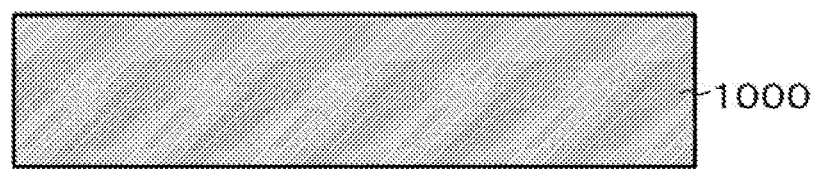
Figure 1C:
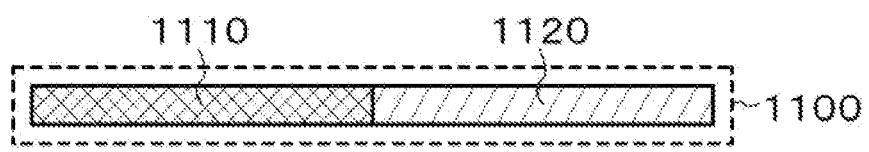
Figure 1C:
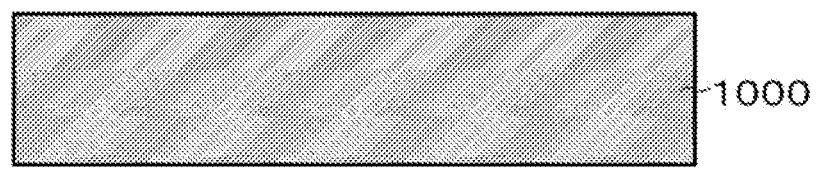

In FIGS. 1A to 1C, optical devices each include an optical element 1000 and a color conversion unit 1100 which light radiated from the optical element 1000 (light emitted from the optical element or light passing through the optical element 1000) enters.

Further, in each of the optical devices in FIGS. 1A to 1C, the color conversion unit 1100 has a color filter region 1110 in which a color filter layer is provided, and a transmissive region 1120 having higher transmittance per unit area than the color filter region 1110.

The following can be given as examples of the structures of the transmissive region 1120; a structure on which the color filter layer is removed, a structure in which the color filter layer is locally thinned, a structure in which a light-transmitting color filter layer containing a dye material (e.g., a pigment) the amount of which is smaller than that of a dye material contained in the color filter layer in the color filter region 1110 is provided.

It is preferable to employ the structure in which the color fitter layer is locally thinned, the structure in which the light-transmitting color filter layer containing the dye material (e.g., a pigment) the amount of which is smaller than that of the dye material contained in the color filter layer in the color lifter region 1110 is provided, or the like, because light that have passed through the transmissive region is converted into a desired color and thus color purity of light extracted outside can be improved.

On the other hand, if improvement of luminance is more important than improvement of color purity, the structure in which the color filter layer is removed is preferable.

That is, each structure has an advantage and is preferably used properly depending on the purpose.

Further, the structure in which the light-transmitting color filter layer containing the dye material (e.g., a pigment) the amount of which is smaller than that of the dye material contained in the color filter layer in the color filter region 1110 is provided is a first structure of the transmissive region 1120.

Further, the structure in which the light-transmitting color filter layer is thinner than the color filter layer in the color filter region 1110 is a second structure.

It is preferable to employ both the first and second structures.

This is because transmittance per unit area is precisely controlled when both the first and second structures are employed as compared to the case where either structure is employed.

For example, there is a case where the color filter layer cannot be thinner than a certain film thickness due to the restriction on the process.

In the case where the color filter layer cannot be thinner than a certain film thickness, the amount of the dye material (e.g., a pigment) contained in the light-transmitting color filter layer may be reduced so that transmittance of the light-transmitting color filter layer per unit is increased.

In addition, the color filter region 1110 and the transmissive region 1120 can be provided variously.

For example, FIG. 1A is an example in which the color filter region 1110 is provided between the transmissive regions 1120.

FIG. 1B is an example in which the transmissive region 1120 is provided between the color filter regions 1110.

FIG. 1C is an example in which the color filter region 1110 and the transmissive region 1120 are provided adjacently.

Note that FIGS. 1A to 1C are examples of the arrangement of the color filter region 1110 and the transmissive region 1120; however, the arrangement is not limited thereto.

This embodiment can be implemented in combination with any of the other embodiments as appropriate.

Embodiment 2

FIGS. 2A to 2D each illustrate an example of a plan view showing a positional relation between the optical element 1000 and the color conversion unit (the color filter region 1110 and the transmissive region 1120).

Note that the portions shown by dashed lines are end portions of the optical elements 1000 in FIGS. 2A to 2D.

Further, FIGS. 2A to 2D each illustrate one unit (e.g., one pixel in the case of a display device).

The optical element 1000, the color filer region 1110, and the transmissive region 1120 each have a square shape to FIGS. 2A to 2D; however, the shapes are not limited thereto, and the optical element 1000, the color filter region 1110, and the transmissive region 1120 may have any shapes.

Figure 2A:
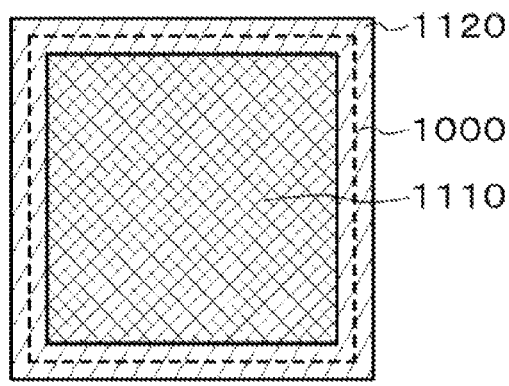
FIGS. 2A to 2D each illustrate an example of a plan view showing a positional relation between an optical element and a color conversion unit.
Figure 2B:
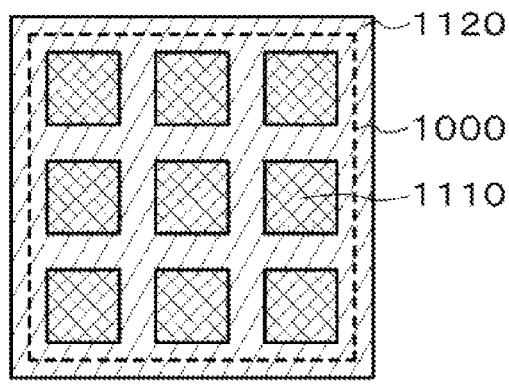

In FIGS. 2A and 2B, the area of the color filter region 1110 is smaller than that of the optical element 1000.

Specifically, the color filter region 1110 has an island shape that is slightly smaller than the optical element 1000 in FIG. 2A.

Further, the color filter region 1110 has a plurality of island-shaped regions in FIG. 2B.

In each, of FIGS. 2A and 2B, the color filter region 1110 is provided inside end portions of the optical element 1000.

Further, in FIGS. 2A and 2B, the transmissive region 1120 has a ring-like shape, and the color filter region 1110 is provided inside the ring-like transmissive region 1120.

Figure 2C:
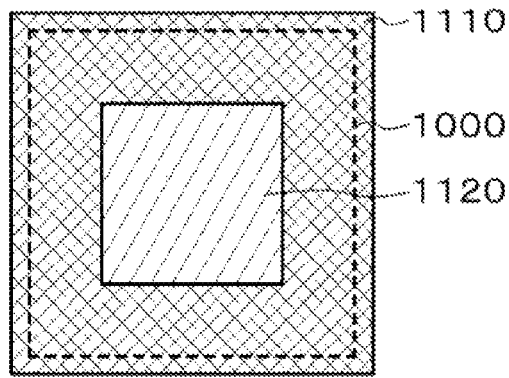
Figure 2D:
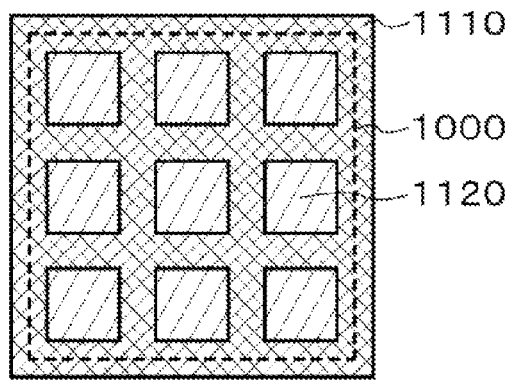

In FIGS. 2C and 2D, the area of the transmissive region 1120 is smaller than that of the optical element 1000.

Specifically, the transmissive region 1120 has an island shape that is slightly smaller than the optical element 1000 in FIG. 2C.

Further, the transmissive region 1120 has a plurality of island-shaped regions in FIG. 2D.

In FIGS. 2C and 2D, the transmissive region 1120 is provided inside the end portions of the optical element 1000.

Further, in FIGS. 2C and 2D, the color filter region 1110 has a ring-like shape, and the transmissive region 1120 is provided inside the ring-like color filter region 1110.

When FIGS. 2A and 2B and FIGS. 2C and 2D are compared with each other, the color filter region 1110 overlaps with the central portion and is concentrated on the central portion.

Accordingly, color purity in FIGS. 2A and 2B when a pixel is seen from the front is superior to that in FIGS. 2C and 2D.

In the case of a lighting device, color purity of light illuminating the front direction of the lighting device is excellent.

Further, in each of FIGS. 2A and 2B, the ring-like transmissive region 1120 is formed on the peripheral portion of the unit; thus, luminance is high in all directions when a pixel seen from an oblique direction.

In the case of a lighting device, luminance of light illuminating an oblique direction of the lighting device is high.

The color filter region 1110 preferably has larger area than that of the transmissive region 1120 in the position overlapping with, the optical element 1000 so that the color filter region is concentrated on the central portion.

However, when a plurality of regions is provided, the total area of these regions is considered.

When the color fiber regions 1110 have the same areas in FIGS. 2A and 2B, it can be said that the density in the vicinity of the central portion in FIG. 2A is higher than that in the vicinity of the central portion in FIG. 2B; thus the structure in FIG. 2A is preferable to the structure in FIG. 2B in order to increase color purity when the pixel seen from the front.

Here, the vicinity of the central portion means a peripheral, portion of the central portion of the unit and a region which accounts for half the area of the unit (preferably, a region which accounts for three fourths of the area of the unit).

In the vicinity of the central portion, a state where the region which accounts for one third or more of the area of the unit (preferably the region which accounts for half or more of the area of the unit, more preferably the region which accounts for two thirds or more of the unit) is the color filter region 1110 is a state where the density of the color filter region 1110 in the vicinity of the central portion is high.

When FIGS. 2A and 2B and FIGS. 2C and 2D are compared with each other, the color filter region 1110 overlaps with the end portion of the optical element 1000 and the color filter 1110 extends beyond the end portion of the optical element 1000 in FIGS. 2C and 2D.

Thus, the color purity in FIGS. 2C and 2D when the pixel is seen from an oblique direction is superior to that in FIGS. 2A and 2B.

It is preferable that the area, of the color filter region 1110 be larger than that of the transmissive region 1120 in order to improve the color purity.

On the other hand, it is preferable that the area of the color fitter 1110 be smaller than that of the transmissive region 1120 in order to improve luminance.

Note that the transmissive region 1120 for improving luminance is an auxiliary light source; thus, the structure in which the area of the color filter region 1110 is larger than that of the transmissive region 1120 is rather preferable in order to improve the color purity.

That is, each structure has an advantage and is preferably used properly depending on the purpose.

This embodiment can be implemented in combination with any of the other embodiments as appropriate.

Embodiment 3

An advantage (1) of FIGS. 2A and 2B is that color purity can be improved when the pixel is seen from the front because the density of the color filter region 1110 is high in the vicinity of the central portion.

An advantage (2) of FIGS. 2A and 2B is that luminance of light radiated in an oblique direction can be improved because the ring-like transmissive region 1120 is formed on the periphery portion of the unit.

An advantage (3) of FIGS. 2C and 2D is that color purity of light radiated in an oblique direction can be improved because the color filter region 1110 overlaps with the end portion of the optical element 1000 and extend beyond the end portion of the optical element 1000.

Figure 3A:
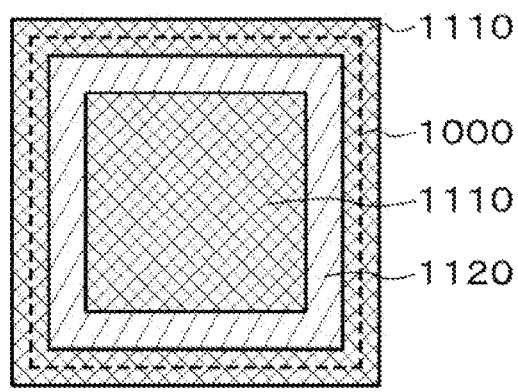
FIGS. 3A to 3D each illustrate an example of a plan view showing a positional relation between an optical element and a color conversion unit.
Figure 3B:
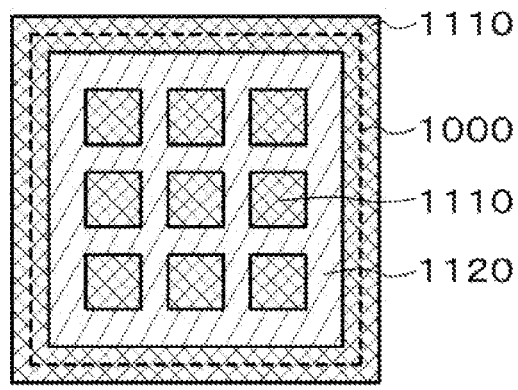
Figure 3C:
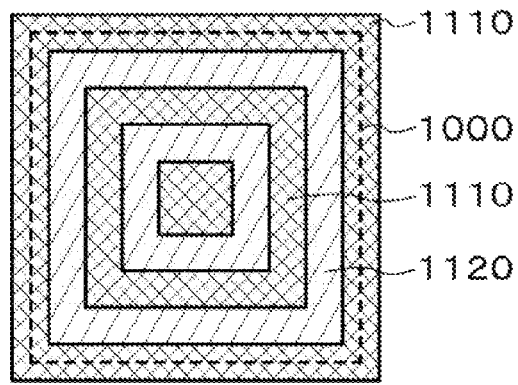
Figure 3D:
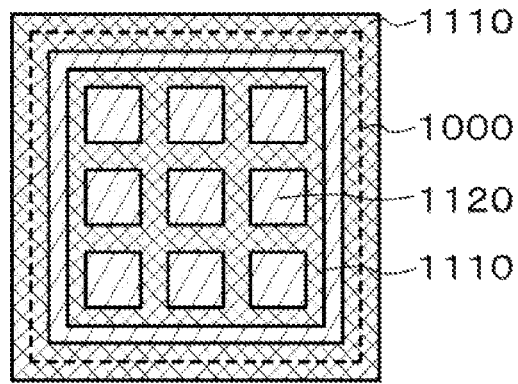

In this embodiment, a structure with which all the advantages (1) to (3) can be obtained is disclosed in each of FIGS. 3A and 3B, and a structure with which at least the advantages (2) and (3) can be obtained is disclosed in each of FIGS. 3C and 3D.

Here, FIGS. 3A to 3D each illustrate an example of a plan view showing a positional relation between the optical element 1000 and the color conversion unit (the color filter region 1110 and the light transmissive region 1120).

Note that the portions shown by dashed lines are end portions of the optical elements 1000 in FIGS. 3A to 3D.

Further, FIGS. 3A to 3D each illustrate one unit (e.g., one pixel in the case of a display device).

Further, the optical, element 1000, the color filter region 1110, and the transmissive region 1120 each have a square shape in FIGS. 3A to 3D; however, the shapes are not limited thereto and the optical element 1000, the color filter region 1110, and the transmissive region 1120 may have any shapes.

In any of FIGS. 3A to 3D, the color filter region 1110 overlaps with the end portion of the optical element 1000 and extends beyond the end portion of the optical element 1000; thus, the advantage (3) can be obtained.

Further, in any of FIGS. 3A to 3D, the ring-like transmissive region 1120 is formed on the periphery portion of the unit; thus, the advantage (2) can be obtained.

Specifically, the transmissive region having a ring-like region is provided adjacent to the inner side of the ring-like color filter region.

Further, in FIGS. 3A and 3B, the density of the color filter region 1110 is high in the vicinity of the central portion; thus, the advantage (1) can be obtained.

Note that also in FIGS. 3C and 3D, the advantage (1) can be obtained by making the density of the color filter region 1110 high in the vicinity of the central portion.

Here, in FIG. 3A, a plurality of the color filter regions 1110 is provided, and an inland-shaped color filter region is provided inside the ring-like color filter region.

Further, in FIG. 3A, the ring-like transmissive region 1120 is provided between the ring-like color filter region and the island-shaped color filter region.

Furthermore, in FIG. 3B, the plurality of color filter regions 1110 is provided, and a plurality of the inland-shaped color filter regions is provided inside the ring-like color filter region.

Further, in FIG. 3B, the transmissive region 1120, which has a ring-like region, is provided between the ring-like color filter region and the island-shaped color filter regions.

Further, in FIG. 3C, the plurality of color filter regions 1110 is provided; a second ring-like color filter region is provided inside a first ring-like color filter region; and one island-shaped color filter region is provided inside the second ring-like color filter region.

In FIG. 3C, a plurality of the ring-like transmissive regions 1120 is provided; a first ring-like transmissive region is provided between the first ring-like color filter region and the second ring-like color filter region; and a second ring-like transmissive region is provided between the second ring-tike color filter region and the island-shaped color filter region.

Further, in FIG. 3D, the plurality of color filter regions 1110 is provided; a ring-like transmissive region is provided inside a ring-like color filter region; and a island-shaped color filter region having a plurality of openings is provided inside the ring-like transmissive region.

Furthermore, in FIG. 3D, the plurality of transmissive regions 1120 is provided; the ring-like transmissive region is provided between the ring-like color filter region and the island-sloped color-filter region having a plurality of openings; and the plurality of island-shaped transmissive regions is provided in the positions of the plurality of openings.

Note that in FIGS. 3A to 3D, the structure of FIG. 3A has high density in the vicinity of the central portion because the transmissive region is not present in the vicinity of the central portion. Thus, it can be said that the advantage (1) is utilized at a maximum and the advantages (2) and (3) are obtained in the structure of FIG. 3A.

This embodiment can be implemented in combination with any of the other embodiments and as appropriate.

Embodiment 4

FIGS. 4 to 4D and FIGS. 5A to 5D each illustrate an example of a positional relation among an optical element 1001, an optical element 1002, an optical element 1003, a red color conversion unit (a color filter region 1111 and a transmissive region 1121), a green color conversion unit (a color filter region 1112 and a transmissive region 1122), and a blue color conversion unit (a color filter region 1113 and a transmissive region 1123).

Note that portions shown by dashed lines are end portions of the optical elements 1001 to 1003 in FIGS. 4A to 4D and FIGS. 5A to 5D.

Further, FIGS. 4A to 4D and FIGS. 5A to 5D each illustrate an example in which color conversion units of three colors (red, green, and blue) are provided in one unit (e.g., one pixel in the case of a display device).

By using three colors of red, green, and blue, full-color display can be achieved.

For the full-color display, a method of using three colors of cyan, magenta and, yellow, a method of using four colors of red, green, blue, and yellow, a method of using four colors of red, green, blue, and white, a method of using five colors of red, green, blue, yellow, and white, and the like can be used, for example. However, the present invention is not limited thereto.

For example, a two-color method may be employed.

As the two-color method, for example, two colors of red and blue, two colors of red and green, two colors of green and blue, two colors of red and yellow, and the like can be given; however, the present invention is not limited thereto.

In addition, white color may be obtained by transmitting white light while a color filter is not provided.

Note that FIGS. 4A to 4D and FIGS. 5A to 5D each illustrate an example, and the shape of the color conversion unit is not limited to those in FIGS. 4A to 4D and FIGS. 5A to 5D.

When plural kinds of color conversion units are used, it is preferable that transmittance per unit area of the light conversion materials be intentionally changed among colors.

As a method for decreasing transmittance per unit area, for example, a method by which the concentration of a dye material (e.g., a pigment) is made high, a method in which a film thickness is increased, or the like is given.

As a method for increasing transmittance per unit area, for example, a method by which the concentration of a dye material (e.g., a pigment) is made low, a method in which a film thickness is decreased, or the like is given.

For example, when three colors of red, green and blue are used, there is a problem in that a green color filter transmits light in wavelength bands other than a green wavelength band as compared to other colors.

Thus, it is preferable that transmittance per unit area of the green color filter be intentionally reduced so that light having wavelength bands other than a green wavelength band can be blocked.

For example, the concentration of a dye material of the green color filter may be made higher than that of a dye material of a red color filter or a blue color filter.

Alternatively, for example, the thickness of the green color filter may be made larger than the thicknesses of the red color filter and the blue color filter.

Alternatively, for example, the concentration of the dye material of the green color filter may be made higher than that of the dye material of the red color filter or that of the dye material of the blue color filter, and the thickness of the green color filter may be made larger than the thicknesses of the red color filter and the blue color filter.

However, in the case where the transmittance per unit area of the green color filter is intentionally reduced, luminance of light transmitting through the green color filter is obviously reduced.

Figure 4A:
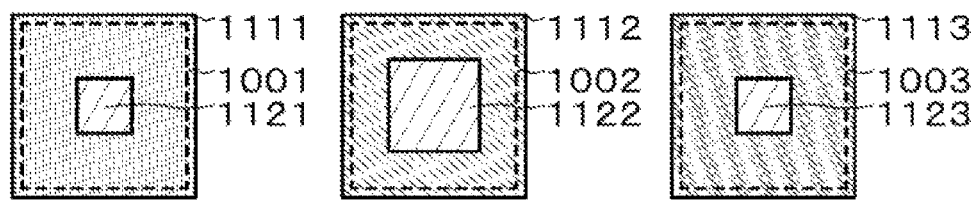
FIGS. 4A to 4D each illustrate an example of a plats view showing a positional relation between an optical element and a color conversion unit.

Thus, the area of the transmissive region 1122 of the green color conversion unit is preferably made larger than that of the transmissive region 1121 of the red color conversion unit and that of the transmissive region 1123 of the blue color conversion unit as shown in FIG. 4A, because luminance of the green color conversion unit in which transmittance per unit area of the color filter is intentionally reduced can be high.

Furthermore, it is preferable that the transmissive region 1122 be provided only for the green color conversion unit and the transmission region be not provided for the color conversion units of other colors, because luminance of the green, color conversion unit in which transmittance per unit area of the color filter is intentionally reduced can be high.

Figure 4B:
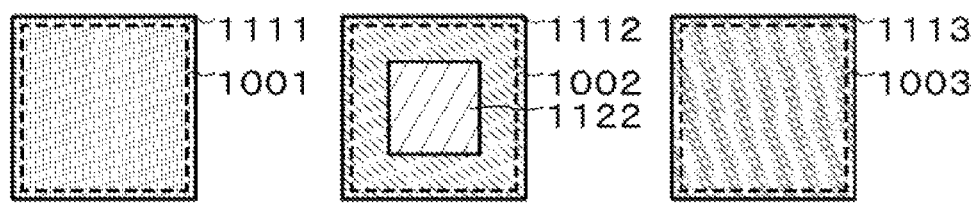
Figure 4C:
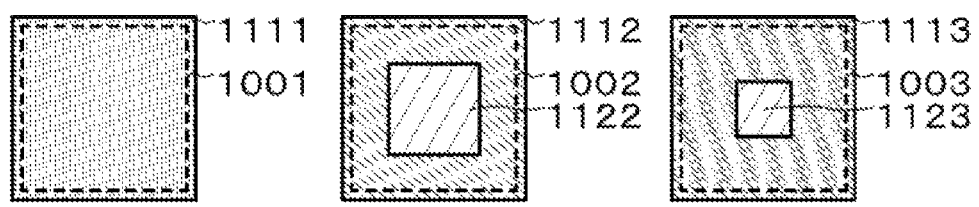

In the case where transmittance per unit area of the blue color filter is lower than transmittance per unit area of the red color filter, the transmissive region 1123 is preferably provided for the blue color conversion unit as shown in FIG. 4C.

In FIG. 4C, transmittance per unit area of the green color filter is lower than transmittance per unit area of the blue color filter; thus, the area of the transmissive region 1123 is made smaller than that of the transmissive region 1122.

Figure 4D:
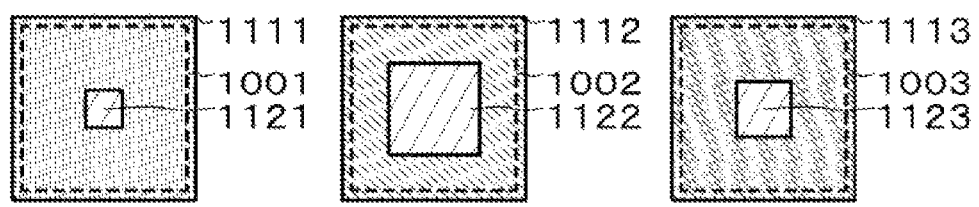

As shown in FIG. 4D, the transmissive region 1121 that has smaller area than the transmissive region 1123 may be provided for the red color conversion unit.

Note that openings are preferably provided for all of the color conversion units for improving the entire luminance.

The structure with the smallest transmissive region is a structure without the transmissive region (the structure in which the area of the transmissive region is zero) as shown in FIGS. 4B and 4C.

FIGS. 4A to 4D each illustrate an example corresponding to FIG. 1C; however, the shape of the transmissive region is not limited the shape shown in FIG. 1C, and any shape can be employed.

For example, FIGS. 5A to 5D each illustrate an example corresponding to FIG. 1A.

Figure 5A:
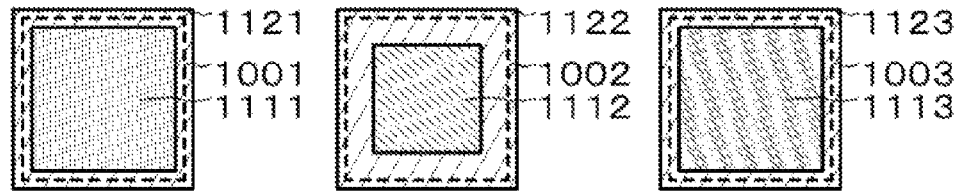
FIGS. 5A to 5D each illustrate an example of a plan view showing a positional relation between an optical element and a color conversion unit.

If is preferable that the area of the transmissive region 1122 of the green color conversion unit be made larger than that of the transmissive region 1121 of the red color conversion unit and that of the transmissive region 1123 of the blue color conversion unit as shown in FIG. 5A, because luminance of the green color conversion unit in which transmittance per unit area of the color filter is intentionally reduced can be high.

Figure 5B:
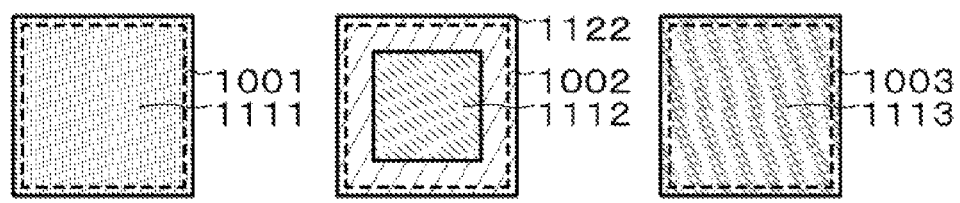

Further, as shown in FIG. 5B, if is preferable that the transmissive region 1122 be provided only for the green color conversion unit and the transmissive region be not provided for the color conversion units of other colors, because luminance of the green color conversion unit in which transmittance per unit area of the color filter is intentionally reduced can be high.

Figure 5C:
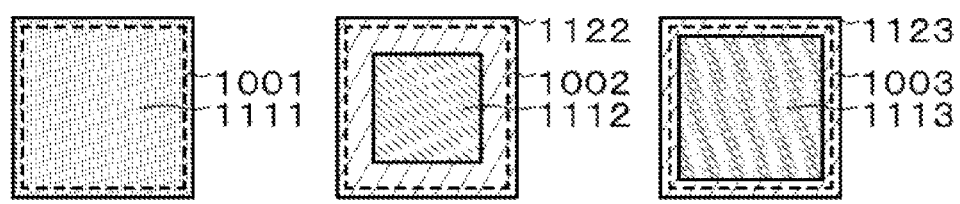

In the case where transmittance per unit area of the green color filter is lower than transmittance per unit area of the red color filter, the transmissive region 1123 is preferably provided for the blue color conversion unit as shown in FIG. 5C.

In FIG. 5C, transmittance per unit area of the green color filter is lower than transmittance per unit area of the blue color filter; thus, the area of the transmissive region 1123 is made smaller than that of the transmissive region 1122.

Figure 5D:
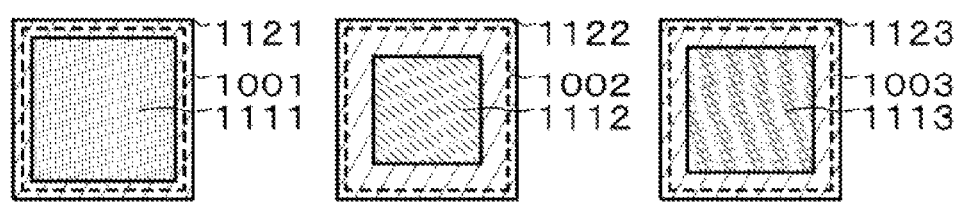

As shown in FIG. 5D, the transmissive region 1121 that has smaller area than the transmissive region 1123 may be provided for the red color conversion unit.

In this embodiment, an example in which the green color filter is made to have the lowest transmittance is described; however, the color filter which is made to have low transmittance can be selected as appropriate depending on characteristics of the dye material (e.g., a pigment).

Accordingly, it is preferable that the area of the transmissive region for the color with the lowest transmittance be made largest, and the area of the transmittance region be gradually made small as the transmittance is increased.

In other words, it is preferable that the area of the color filter region with the highest transmittance be made largest, and the area of the color filter region be gradually made small as the transmittance is decreased.

This embodiment can be implemented in combination with any of the other embodiments as appropriate.

Embodiment 5

An example of a method for manufacturing a color conversion unit is described.

Figure 6A:
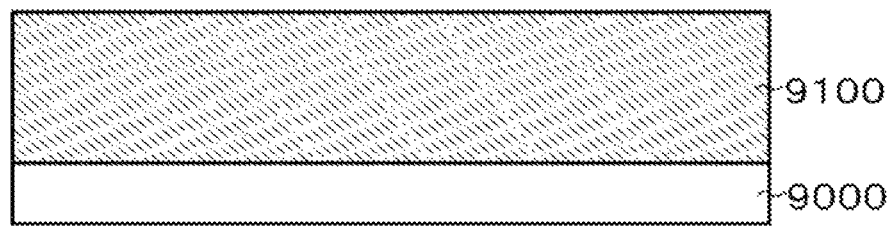
FIGS. 6A to 6C illustrate examples of methods for manufacturing color conversion units.

As shown in FIG. 6A, a color filter 9100 is formed on an insulating surface 9000.

The insulating surface 9000 is an insulator. Examples of the insulator include, but are not limited to, an insulating film and an insulating substrate.

The color filter 9100 can be any insulating film containing a dye material (e.g., a pigment).

An insulating film including an organic material such as polyimide, acrylic, or organic siloxane, to which the dye material is added, is preferably used as the color filter 9100.

Figure 6B:
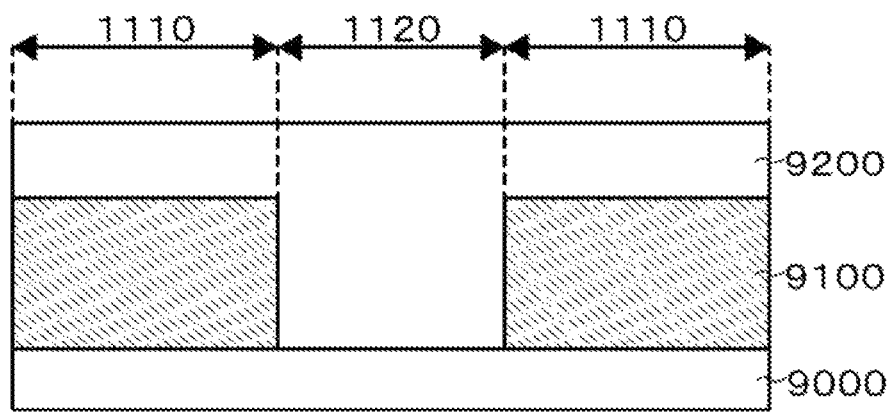
Figure 6C:
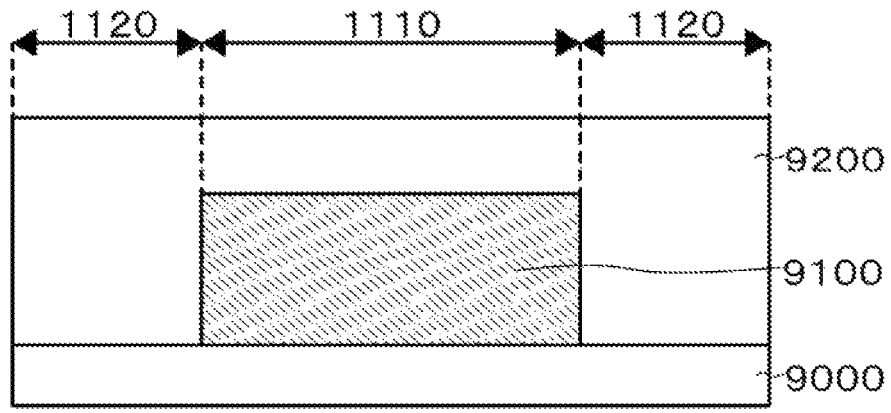

Next, as shown in FIGS. 6B and 6C, an insulating film 9200 is formed after a portion to be the transmissive region 1120 is removed.

Any insulating film having a light-transmitting property can be used as the insulating film 9200.

Note that the insulating film 9200 is not a necessary component; however, an insulating film including an organic material such as polyimide, acrylic, or siloxane is preferably used as the insulating film 9200.

Specifically, when a color conversion unit used for a counter substrate of a liquid crystal display device is formed, a surface of the color conversion unit has flatness with the use of the insulating film including an organic material as the insulating film 9200, whereby a problem of declination due to an uneven surface of the color conversion unit can be solved.

When a color conversion unit is formed on an element substrate side of an optical device (referred to as a color filter on array), a surface of the color conversion unit has flatness with the use of the insulating film including an organic material as the insulating film 9200, whereby disconnection of an optical element, a wiring, and the like formed over a top face of the color conversion unit can be prevented.

In FIGS. 6B and 6C, the transmissive region 1120 is a region where the color filter is removed.

Figure 7A:
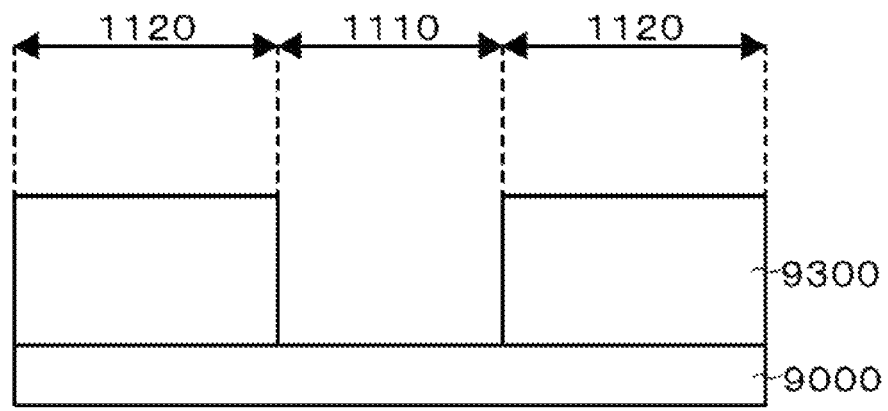
Figure 7A:
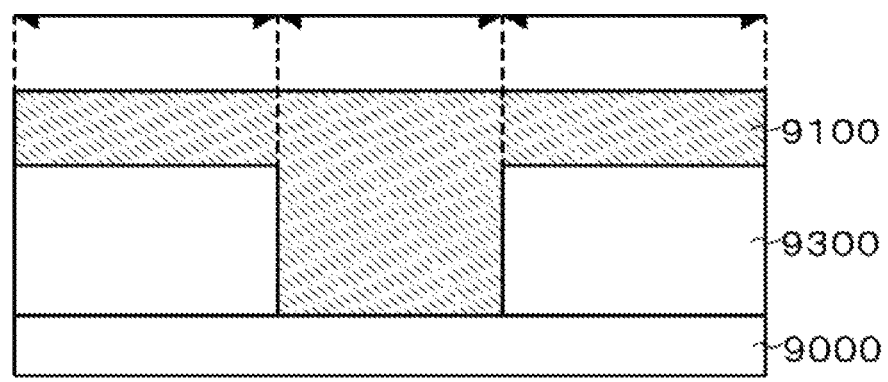
Figure 7C:
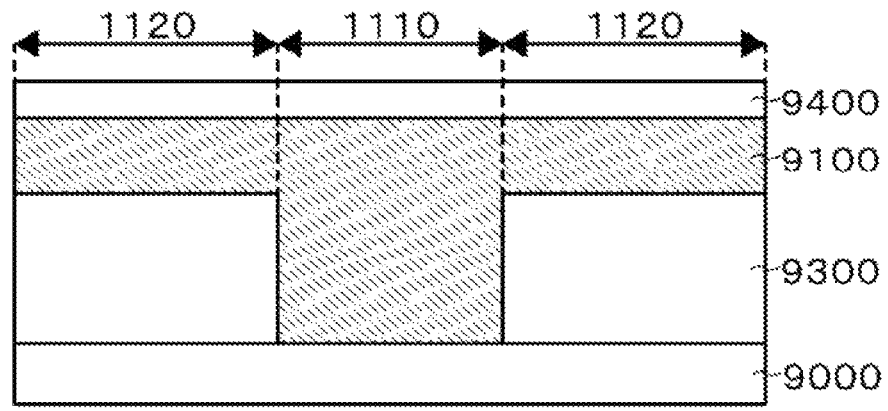

FIGS. 7A to 7C show another example.

As shown in FIG. 7A, an insulating film 9300 is formed such that an opening or a groove is formed in the position to be the color filter region 1110.

Note that the opening means a removed region formed so as not to divide the color filter (e.g., a region having a shape like the transmissive region 1120 shown in FIGS. 2C and 2D, or a region having a shape like the plurality of transmissive regions 1120 shown in FIG. 3D).

Further, the groove means a removed region formed so as to divide the color filter (e.g., a region having a shape like the transmissive region 1120 shown in FIG. 2B, and FIGS. 3A to 3C, or a region having a shape like the ring-dike transmissive region 1120 shown in FIG. 3D).

Any insulating film having a light-transmitting property can be used as the insulating film 9300.

Next, the color filter 9100 is formed in the color filter region 1110 and the transmissive region 1120 as shown in FIG. 7B.

Here, it is preferable that an insulating film including an organic material be used as the color filter 9100, and that the color filter 9100 in the color filter region 1110 be formed thicker than die insulating film 9300.

This is because, with the use of the insulating film including an organic material as the color filter 9100, the opening or the groove is filled with the color filter 9100 and the color filter 9100 is formed so that the color filter 9100 in the transmissive region 1120 is thinner than the color filter 9100 in the color filter region 1110.

An insulating film including an organic material is used as the color filter 9100, whereby a surface of the color filter 9100 has flatness.

That is, the surface of the color conversion unit has flatness.

Specifically, when the color conversion unit used for the counter substrate of the liquid crystal display device is formed, the surface of the color conversion unit has flatness with the use of the insulating film including an organic material as the color filter 9100, whereby a problem of declination due to an uneven surface of the color conversion unit can be solved.

Further, when the color conversion unit is formed on the element substrate side of the optical device (referred to as a color filter on array), the surface of the color conversion unit has flatness with the use of the insulating film including an organic material as the color filter 9100, whereby disconnection of an optical element, a wiring, and the like formed over the top surface of the color conversion unit can be prevented.

Further, an insulating film 9400 is preferably provided on the surface of the color filter 9100 as a protective film for preventing diffusion of the dye material from the color filter 9100.

Any insulating film having a light-transmitting property can be used as the insulating film 9400.

The insulating film 9400 is preferably an insulating film including an inorganic material (e.g., a silicon oxide film, a silicon nitride film, an aluminum oxide film, an aluminum nitride film, or the like) to improve a function as the protective film.

The insulating film including an inorganic material does not have an effect of flattening the surface of the color conversion unit; however, it is possible for the surface of the color conversion unit to have flatness even in the case of using the insulating film including an inorganic material because the surface of the color filter 9100 in a lower layer has flatness.

Figure 8A:
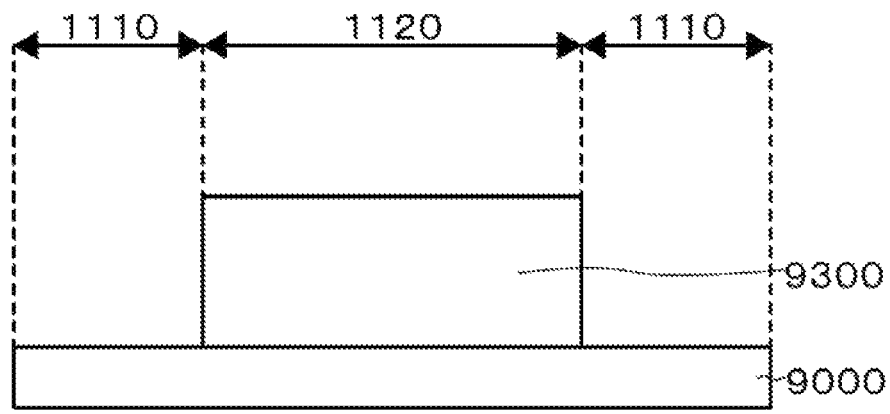
FIGS. 8A to 8C illustrate examples of methods for manufacturing color conversion units.
Figure 8B:
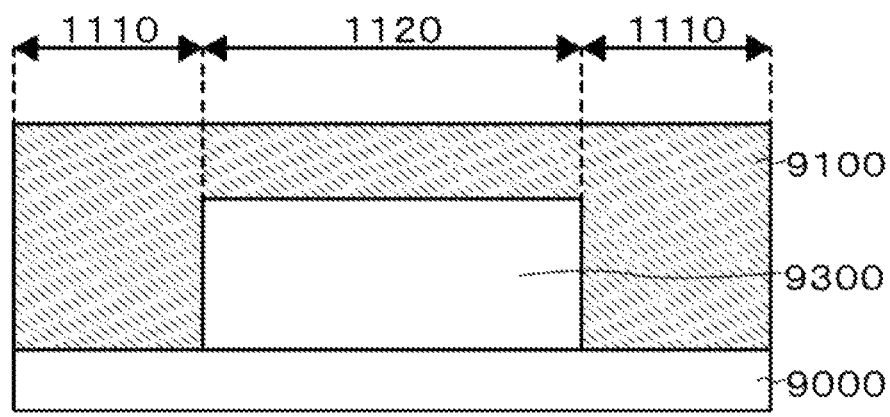
Figure 8C:
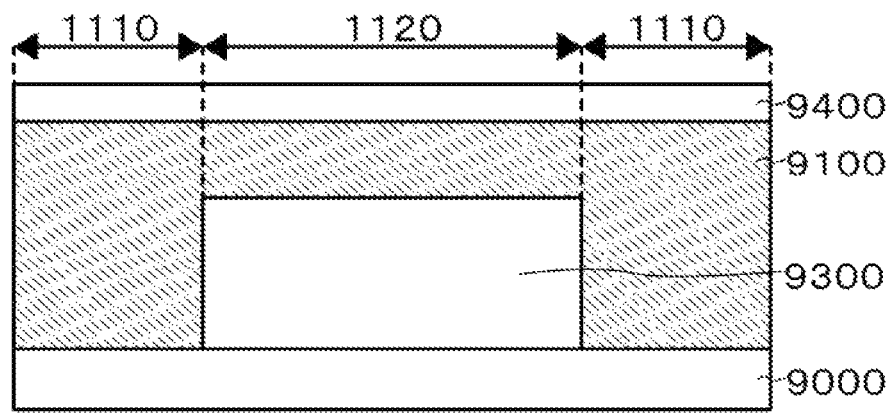

Note that as shown in FIGS. 8A to 8C, an island-shaped insulating film 9300 may be used instead of the insulating film 9300 having an opening or a groove.

By using the manufacturing method shown in any of FIGS. 7A to 7C and FIGS. 8A to 8C, the color filter 9100 in the transmissive region 1120 can be thinner than that in the color filter region 1110.

As a simple method for making the color filter 9100 in the transmissive region 1120 thinner than that in the transmissive region 1110, a method for locally etching a color filter using a photoresist mask is given. However, it is difficult to have high etching selectivity of the color filter with respect to the photoresist mask because the photoresist mask and the color filter are formed using the same kind of material.

It is difficult to have high etching selectivity of the color filter with respect to the photoresist mask, which means that the thickness of the color filter in the transmissive region 1110 is difficult to control.

On the other hand, when the structure shown in any of FIGS. 7A to 7C and FIGS. 8A to 8C is employed, the difference between the thickness of the color filter 9100 in the color filter region 1110 and the thickness of the insulating film 9300 in the transmissive region 1120 is the thickness of the color filter 9100 in the transmissive region 1120, so that the thickness of the color filter is easily controlled.

That is, the structures shown in FIGS. 7A to 7C and FIGS. 8A to 8C are unique structures in which a manufacturing process is taken into account.

Note that an optical element is preferably provided on the surface (top surface) side of the color conversion unit in each of FIGS. 6A to 6C, FIGS. 7A to 7C, and FIGS. 8A to 8C.

This embodiment can be implemented in combination with any of the other embodiments as appropriate.

Embodiment 6

Figure 9A:
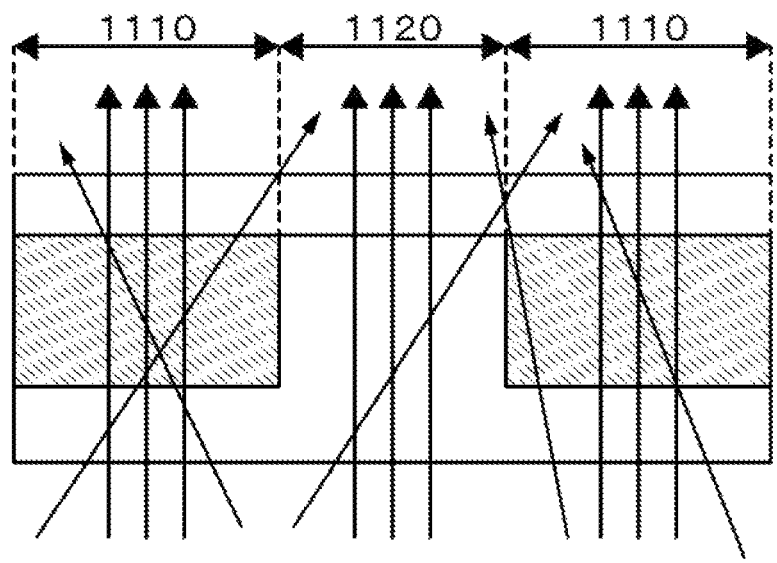
FIGS. 9A and 9B each illustrate an example of a color conversion unit.
Figure 9B:
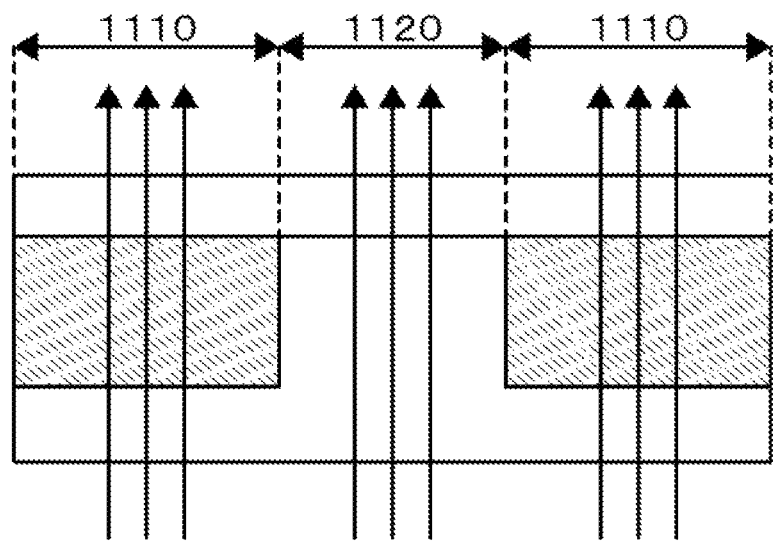

FIGS. 9A and 9B each illustrate an example of the case where a color conversion unit having the color filter region 1110 and the transmissive region 1120 transmit white light radiated from an optical element.

Note that FIGS. 9A and 9B each illustrate an example of using the color conversion unit shown in FIG. 6B.

As shown in FIG. 9A, the white light radiated from the optical element diffuses in a vertical direction and an oblique direction, so that the white light and colored light which has passed through the color filter are mixed in the transmissive region 1120; as a result, the colored light is visible also in the transmissive region 1120.

In this specification, "colored light" particularly means light having a chromatic color and a gray color.

Here, when only the light in a vertical direction is considered, as in FIG. 9B, the colored light in a vertical direction does not reach the transmissive region 1120.

Figure 10A:
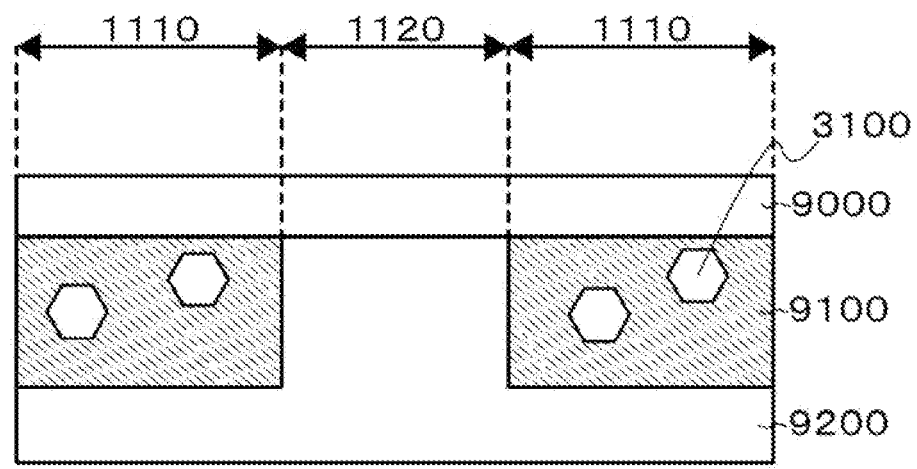
FIGS. 10A and 10B each illustrate an example of a color conversion unit.
Figure 10B:
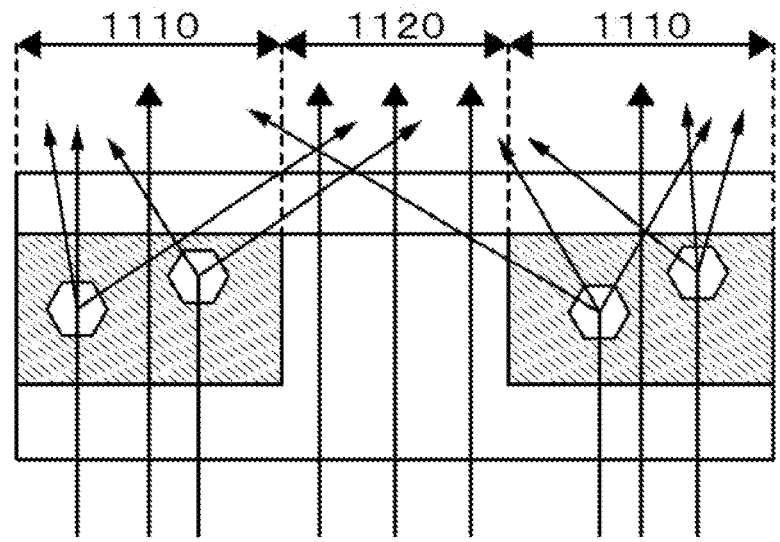

A method for diffusing part of the colored light in a vertical direction into the transmissive region is shown in FIGS. 10A and 10B.

Specifically, as shown in FIG. 10A, a plurality of particles 3100 having light scattering properties is included in the color filter 9100.

By the plurality of particles 3100 having light scattering properties included in the color filter 9100, part of the colored light in a vertical direction can be scattered and can reach the transmissive region 1120 as shown in FIG. 10B.

That is, part of light in a vertical direction which has reached the color filter region 1110, i.e., colored light, can reach the transmissive region 1120, so that color purity of the transmissive region 1120 can be improved.

Figure 11A:
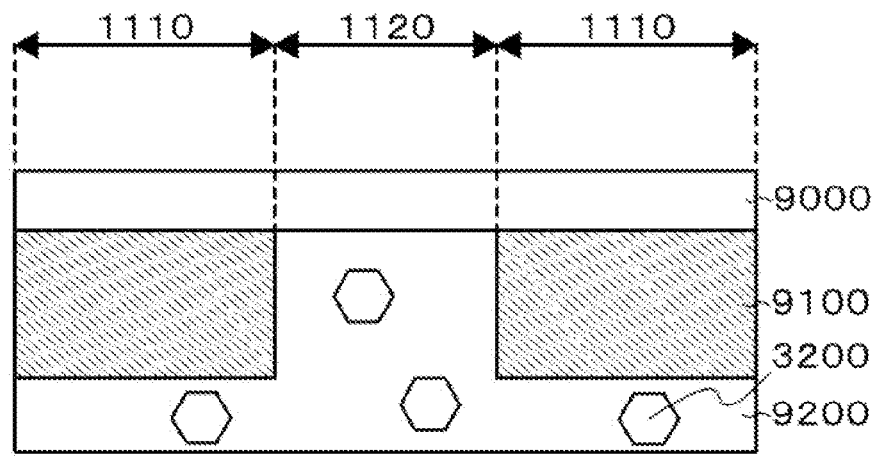
FIGS. 11A to 11C each illustrate an example of a color conversion unit.

Further, when a plurality of particles 3200 having light scattering properties is included in the insulating film 9200 as shown in FIG. 11A, part of light (white light) in a vertical direction which has reached the transmissive region 1120 can reach the color filter region 1110, so that luminance of the color filter region 1110 can be improved.

Figure 11B:
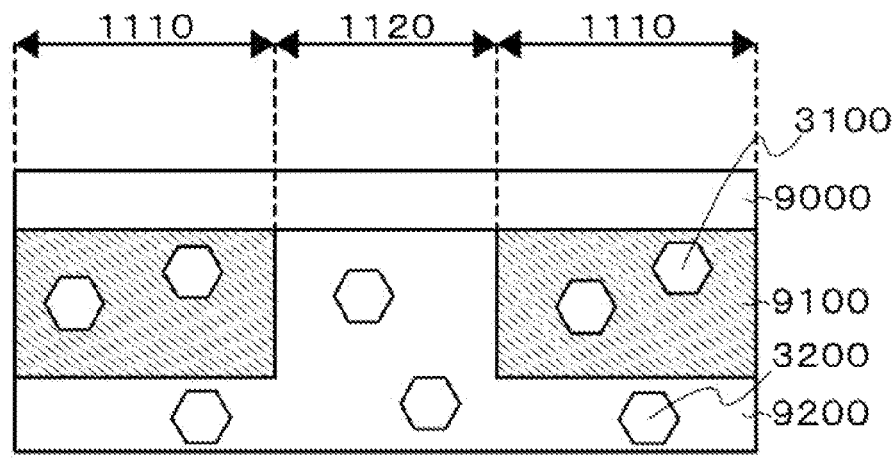

Further, as shown in FIG. 11B, the inclusion of a plurality of light scattering particles both in the color filter 9100 and the insulating film 9200 is more effective.

Figure 11C:
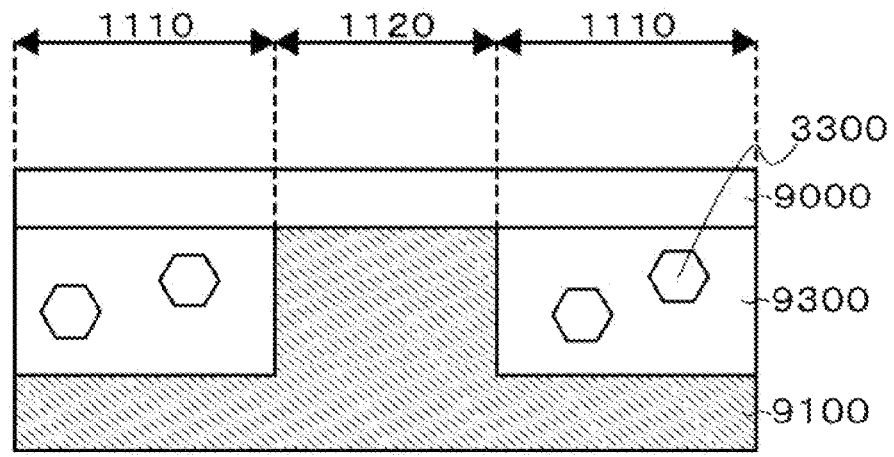

Furthermore, as shown in FIG. 11C, a plurality of particles 3300 having light scattering properties may be included in the insulating film 9300.

Furthermore, the inclusion of a plurality of light scattering particles in the color filter 9100 is more effective in FIG. 11C.

Further, when the plurality of light scattering particles is included in the entire insulator (in the color filter region and transmissive region) such as the insulating film 9400 in FIG. 7C and FIG. 8C, an advantageous effect similar to that in the case where the plurality of light scattering particles is included both in the color filter 9100 and the insulating film 9200 can be obtained.

Note that the plurality of particles may be included in either the color filter region or the transmissive region in an insulator such as the insulating film 9400.

When an insulator including a plurality of light scattering particles that is located below the color filter 9100 and above the insulating surface 9000 is provided both in the transmissive region 1120 and the color filter region 1110, an advantageous effect similar to the case where the plurality of light scattering particles is included in the color filter 9100 and the insulating film 9200 can be obtained.

As described above, colored light and white light can be mixed across a wide area with the use of the plurality of light scattering particles, so that color purity of visible light can be improved.

As the plurality of light scattering particles, particles having reflectivity, particles having a refractive index different from that of a color filter or an insulating film, or the like can be used.

As the particles having reflectivity, for example, metal particles and the like are given.

As the particles having a refractive index different front that of a color filter or an insulating film, glass particles, plastic particles, ceramic particles, carbon particles, and the like are given.

Note that the shape of the particle is a spherical shape, a polyhedral shape, a columnar shape, a needle shape, a conical shape, a pyramidal shape, or the like.

It is preferable that a plurality of projections and depressions be formed on the surface of the particle having a spherical shape, a polyhedral shape, a columnar shape, a needle shape, a conical shape, a pyramidal shape, or the like because a diffusion effect is improved.

Note that the shape in which a plurality of projections and depressions is formed on the surface of a particle is referred to as a kompeito shape because the shape is similar to kompeito that is a Japanese traditional candy.

This embodiment can be implemented in combination with any of the other embodiments.

Embodiment 7

An example of an EL display device is described.

Figure 12A:
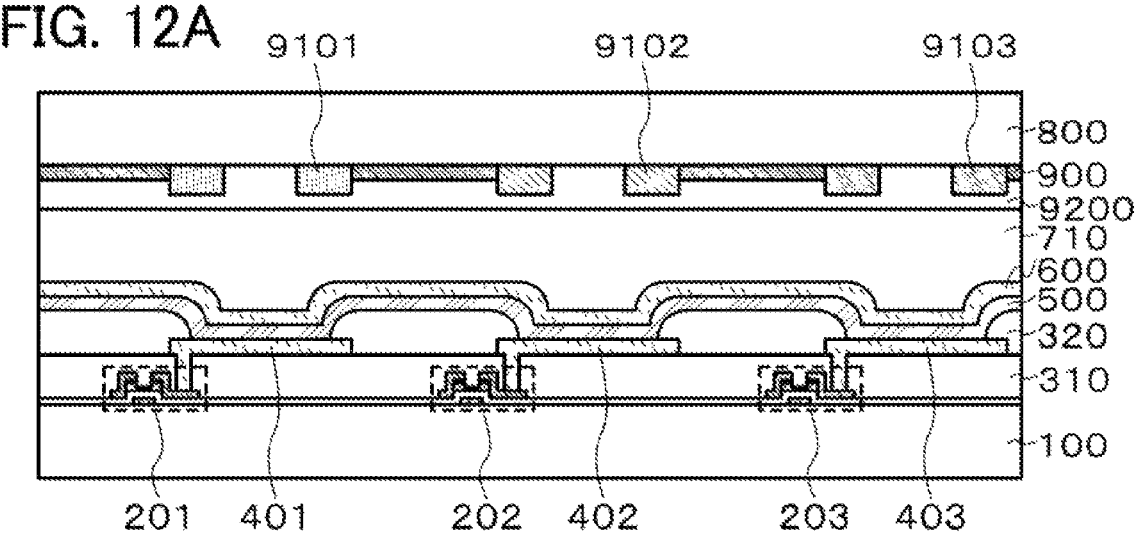
FIGS. 12A to 12C each illustrate an example of an EL display device.

In FIG. 12A, a switching element 201, a switching element 202, and a switching element 203 are formed over a first substrate 100.

Further, in FIG. 12A, an insulating film 310 provided with a plurality of contact holes is formed over the switching element 201, the switching element 202, and the switching element 203.

Further, in FIG. 12A, a lower electrode 401, a lower electrode 402, and a lower electrode 403 electrically connected to the switching element 201, the switching element 202, and the switching element 203, respectively, through the contact holes are formed over the insulating film 310.

Further, in FIG. 12A, an insulating film 320 covering end portions of the lower electrodes 401, 402, and 403 and having a plurality of openings is formed.

Furthermore, in FIG. 12A, an electroluminescence layer 500 is formed over the lower electrodes 401, 402, and 403, and the insulating film 320.

In FIG. 12A, an upper electrode 600 is formed over the electroluminescence layer 500.

In FIG. 12A, a second substrate 800 on which a color conversion unit is formed so as to face the upper part of the upper electrode 600 is provided with a space 710 provided between the first substrate 100 and the second substrate 800.

Note that the color conversion unit is formed on the second substrate 800, and the first substrate 100 is provided on the surface (top surface) side of the color conversion unit.

The color conversion unit in FIG. 12A includes a black matrix 900, a red color filter 9101, a green color filter 9102, and a blue color filter 9103 which are formed on the second substrate 800.

In FIG. 12A, the black matrix 900 is provided between adjacent color filters.

Further, an opening or a groove is formed in each of the red color filter 9101, the green color filter 9102, and the blue color filter 9103.

Note that the opening means a removed region formed so as not to divide the color filter (a region having a shape like the transmissive region 1120 shown in FIGS. 2C and 2D, or a region having a shape like the plurality of transmissive regions 1120 shown in FIG. 3D).

Further, the groove means a removed region formed so as to divide the color filter (e.g., a region having a shape like the transmissive region 1120 shown in FIG. 2B, and FIGS. 3A to 3C, or a region having a shape like the ring-like transmissive region 1120 shown in FIG. 3D).

In FIG. 12A, the insulating film 9200 is formed on the black matrix 900, the red color filter 9101, the green color filter 9102, and the blue color filter 9103.

As the first and second substrates, a substrate having a light-transmitting property, a substrate having a light-shielding property, or the like can be used.

As the substrate having a light-transmitting property, there are a glass substrate, a quartz substrate, a plastic substrate having a light-transmitting property, and the like.

As the substrate having a light-shielding property, there are a plastic substrate having a light-shielding property, a metal (e.g., stainless steel or aluminum) substrate, a semiconductor substrate (e.g., a silicon wafer), a paper substrate, and the like.

Because light extraction is needed, at least one of the first and second substrate has a light-transmitting property.

For example, in FIG. 12A, light is extracted from the second substrate side; thus, the second substrate is to be a substrate having a light-transmitting property. Further, in FIGS. 16A to 16C and FIGS. 17A to 17C, light is extracted from the first substrate side; thus, the first substrate is to be a substrate having a light-transmitting property. That is, the substrate provided in the direction from which light is extracted is to be a substrate having a light-transmitting property.

It is needless to say that both the first and second substrates may have a light-transmitting property.

An assembly of the first substrate and all the components formed on the first substrate side is called an element substrate.

An assembly of the second substrate and all the components formed on the second substrate side is called a counter substrate.

Any switching element can be used.

Examples of the switching element include, but are not limbed to, a thin film transistor formed over a substrate having an insulating surface, a transistor formed using a semiconductor substrate, and the like.

In FIG. 12A, a bottom gate transistor is used as the switching element; however, a top gate transistor may be used.

An organic material or an inorganic material can be used as a material of the insulating film.

As the organic material, polyimide, acrylic, organic siloxane, or the like can be used; however, the present invention is not limited thereto.

For the inorganic material, diamond-like carbon, silicon nitride, silicon oxynitride, silicon nitride oxide, silicon oxide, aluminum nitride, aluminum oxynitride, aluminum nitride oxide, or the like can be used, but the present invention is not limited to these materials.

Note that the insulating film may have a single layer structure or a stacked structure.

In FIG. 12A, only the insulating film 310 is provided between the switching elements and the lower electrodes; however, a multi-layer wiring structure may be employed by adding an insulating film and a wiring between the switching elements and the lower electrodes.

The lower and upper electrodes can be formed using, but not limited to, metal, an oxide conductor, or the like.

For instance, as the lower and upper electrodes, metal nitride, metal oxide, or a metal alloy which has conductivity may be used.

The lower and upper electrodes may have a single-layer structure or a stack structure.

Examples of the metal include, but not limited to, tungsten, titanium, aluminum, molybdenum, gold, silver, copper, platinum, palladium, iridium, alkali metal, alkaline-earth metal, and the like.

Examples of the oxide conductor include, but not limited to, indium tin oxide, zinc oxide, zinc oxide containing indium, zinc oxide containing indium and gallium, and the like.

A material having a low work function (e.g., alkali metal, alkaline-earth metal, a magnesium-silver alloy, an aluminum-lithium alloy, or a magnesium-lithium alloy) is preferably applied to a cathode.

A material having a high work function (e.g., an oxide conductor) is preferably applied to an anode.

Because light extraction is needed from a light source, at least one of the first and second electrodes has a light-transmitting property. An electrode through which light is to be extracted is to be an electrode having a light transmitting property.

Note that an oxide conductor has a light-transmitting property.

Further, a light-transmitting property can be achieved even with metal, metal nitride, metal oxide, or a metal alloy by a reduction in thickness (a thickness of 50 nm or less is preferable).

Further, an EL element (a light-emitting element) is formed of the upper electrode, the electroluminescence layer, and the lower electrode.

The electroluminescence layer includes a light-emitting unit which includes at least a light-emitting layer containing an organic compound or an inorganic compound.

In the case of using a light-emitting layer containing an organic compound, the light-emitting unit may include an electron-injection layer, an electron-transport layer, a hole-injection layer, a hole-transport layer, and the like in addition, to the light-emitting layer. Note that the EL element including a light-emitting layer containing an organic compound is an organic EL element.

In the case of using a light-emitting layer including an inorganic compound, the light-emitting unit may include a dielectric layer and the like in addition to the light-emitting layer. Note that the EL element using a light-emitting layer including an inorganic compound is an inorganic EL element.

In addition, the electroluminescence layer can have an improved luminance by including a plurality of light-emitting units and a charge generation layer partitioning the plurality of light-emitting units.

For the charge generation layer, metal, an oxide conductor, a stack structure of metal oxide and an organic compound, a mixture of metal oxide and an organic compound, or the like can be used.

For the charge generation layer, use of the stack structure of metal oxide and an organic compound, the mixture of metal oxide and an organic compound, or the like is preferred, because such materials allow hole injection in the direction of the cathode and electron injection in the direction of the anode upon application of a voltage.

Examples of the metal oxide that is preferably used for the charge generation layer include oxide of transition metal, such as vanadium oxide, niobium oxide, tantalum oxide, a chromium oxide, molybdenum oxide, tungsten oxide, manganese oxide, and rhenium oxide.

As the organic compound used for the charge generation layer, an amine-based compound (an arylamine compound in particular), a carbazole derivative, aromatic hydrocarbon, Alq, or the like is preferably used, because these materials form a charge-transfer complex with the oxide of transition metal.

The space 710 is preferably filled with an inert gas (nitrogen, a rare gas, or the like), or a sealant.

Any material having a light-shielding property can be used as the black matrix.

Further, the black matrix is not a necessary component and thus is not necessarily provided.

As a material of the black matrix, a metal film, an insulating film including an organic material including a black dye material, or the like can be used; however, the material is not limited thereto.

Further, the black matrix may be formed with color fibers of different colors superposed on each other.

The description in Embodiment 5 (a method for manufacturing a color conversion unit) may be referred to for the color filters 9101, 9102, and 9103, and the insulating film 9200.

FIG. 12A illustrates an example in which the electroluminescence layer 500 emits white light.

By using red, green, and blue color filters, full-color display can be achieved.

For the full-color display, it is not limited to the combination of red, green, and blue, and may be a combination of cyan, magenta, and yellow, a combination of red, blue, green, and white, or the like.

A structure in winch a color filter is not provided may be employed for a portion where white is to be used.

In FIG. 12A, the electroluminescence layer 500 emits white light. Because a gap (an opening or a groove) is provided for the color filter of the color conversion unit, luminance in each pixel is compensated by white light passing through the gap (the opening or the groove).

Note that the gap is a transmissive region and a portion where the color filter is formed is a color filter region.

This embodiment can be implemented in combination with any of the other embodiments as appropriate.

Embodiment 8

FIGS. 12B and 12C, and FIGS. 13A to 13C each illustrate an example in which modification is made to the structure of the color conversion unit in FIG. 12A.

Figure 12B:
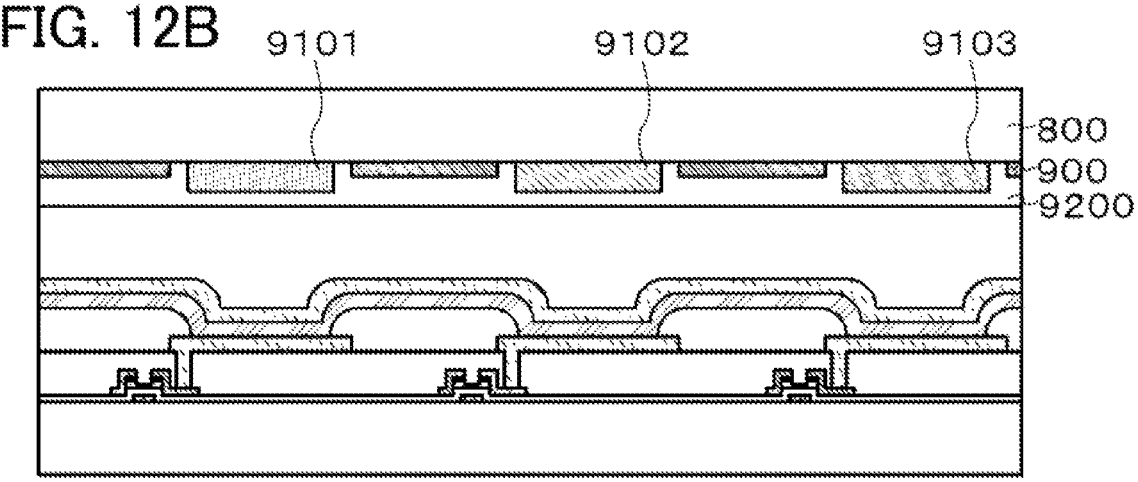

The color filter in FIG. 12B is formed to have a shape corresponding to that of FIG. 2A, and the area of the color filter is made, slightly smaller than that of the light-emitting region of the light-emitting element in each pixel.

The area of the color filter is made slightly smaller than that of the light-emitting region of the light-emitting element in FIG. 12B, so that a gap is formed in the vicinity of the light-emitting region of the light-emitting element, whereby luminance in each pixel is compensated by white light passing through the gap.

In FIG. 12B, a black matrix 900 having a plurality of openings in a position corresponding to a plurality of light-emitting regions is provided; thus, it can also be said that a color filter is provided so that a gap is formed between the color filter and the black matrix 900.

Figure 12C:
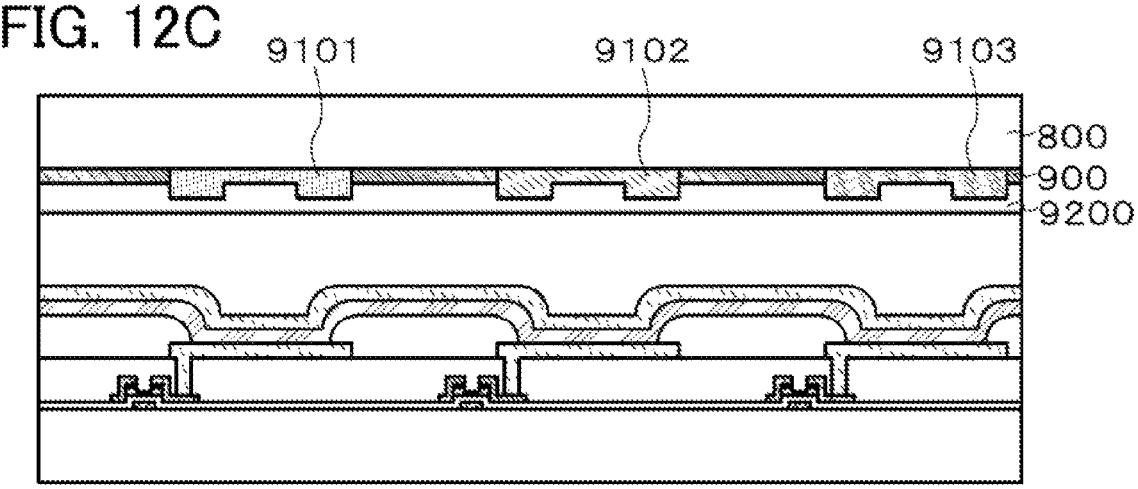

In FIG. 12C, the color filler is locally etched, whereby a portion where the color filter is locally thinned (transmissive region) is formed.

In FIG. 12C, the transmissive region is provided in the vicinity of the central portion of the light-emitting region.

In FIG. 12B, luminance in each pixel is compensated by light passing through the transmissive region.

In FIGS. 12A and 12B, light passing through the gap which is a transmissive region is white light. In FIG. 12C, on the other hand, light passing through the portion that is a transmissive region, where a color filter is locally thinned, is colored light. Thus, color purity of a pixel can be improved compared to that in FIGS. 12A and 12B.

Figure 13A:
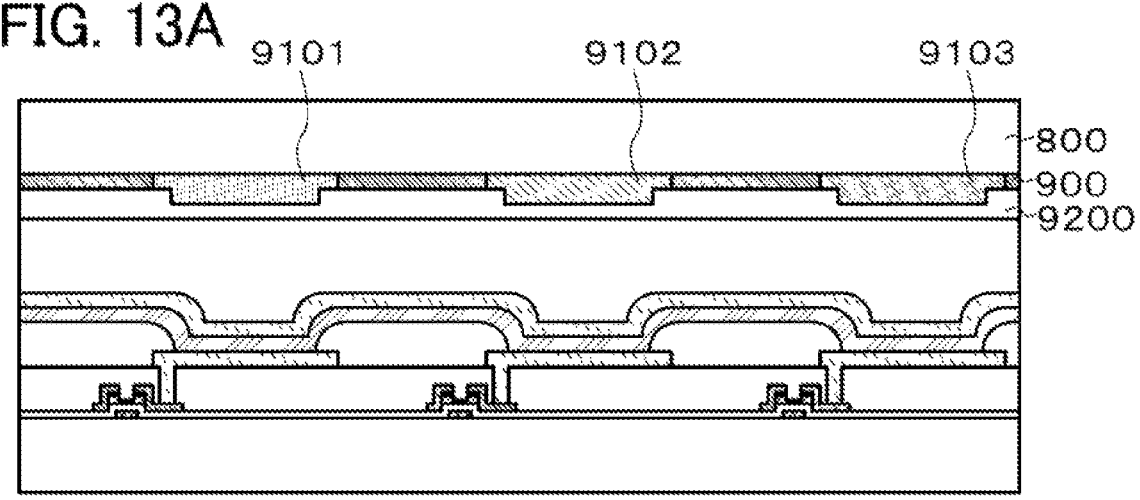
FIGS. 13A to 13C each illustrate an example of an EL display device.
Figure 13B:
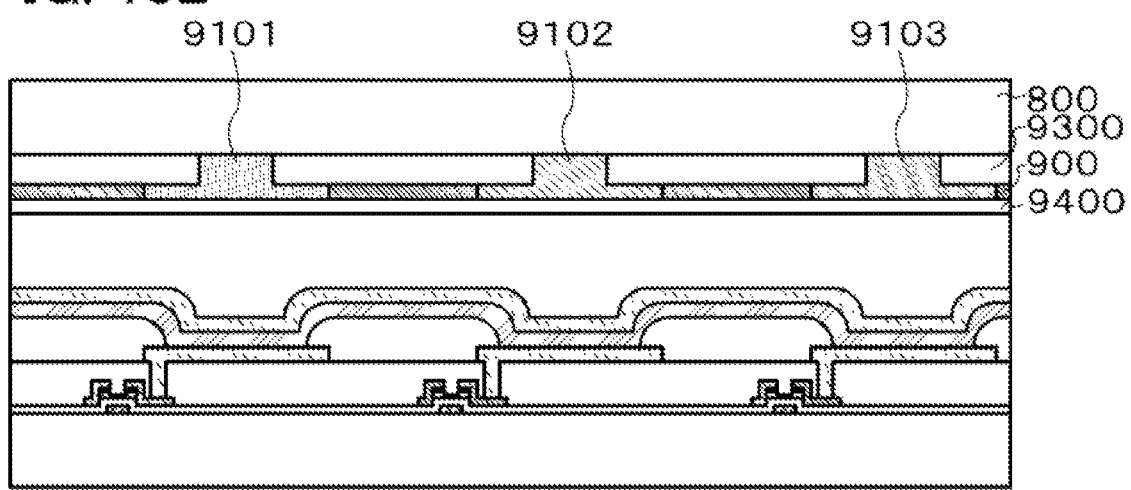
Figure 13C:
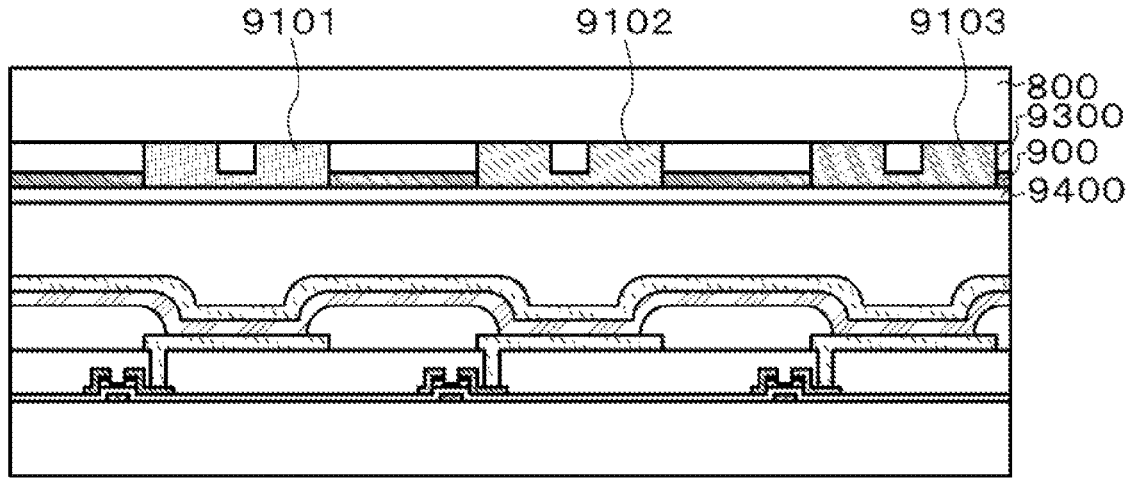

In FIG. 13C, the color filter is locally etched, whereby a portion where the color fitter is locally thinned (transmissive region) is formed.

In FIG. 13A, the transmissive region is provided in the vicinity of the light-emitting region.

In FIG. 13A, an advantageous effect similar to that in FIG. 12C can be obtained.

FIG. 13B shows the case where the color conversion unit shown in FIG. 7C is used.

FIG. 13C shows the case where the color conversion unit shown in FIG. 8C is used.

This embodiment can be implemented in combination with any of the other embodiments as appropriate.

Embodiment 9

Figure 14A:
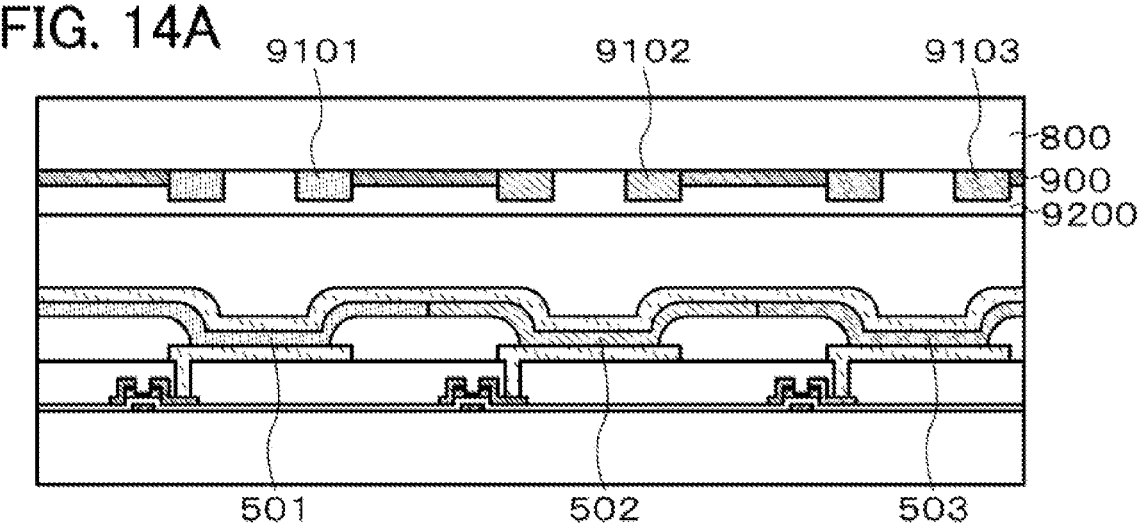
FIGS. 14A to 14C each illustrate an example of an EL display device.
Figure 14B:
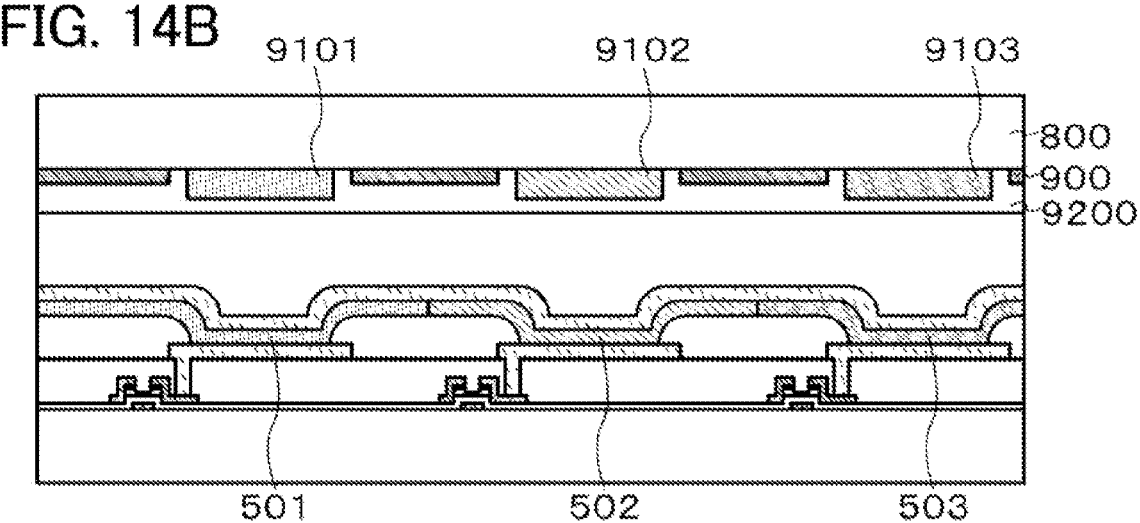
Figure 14C:
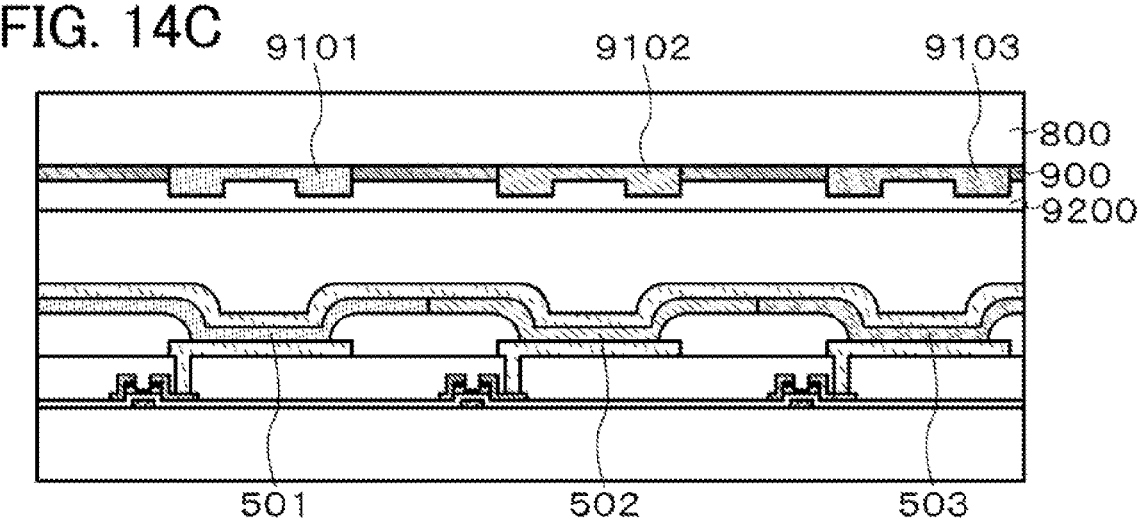

FIGS. 14A to 14C correspond to FIGS. 12A to 12C, respectively.

Figure 15A:
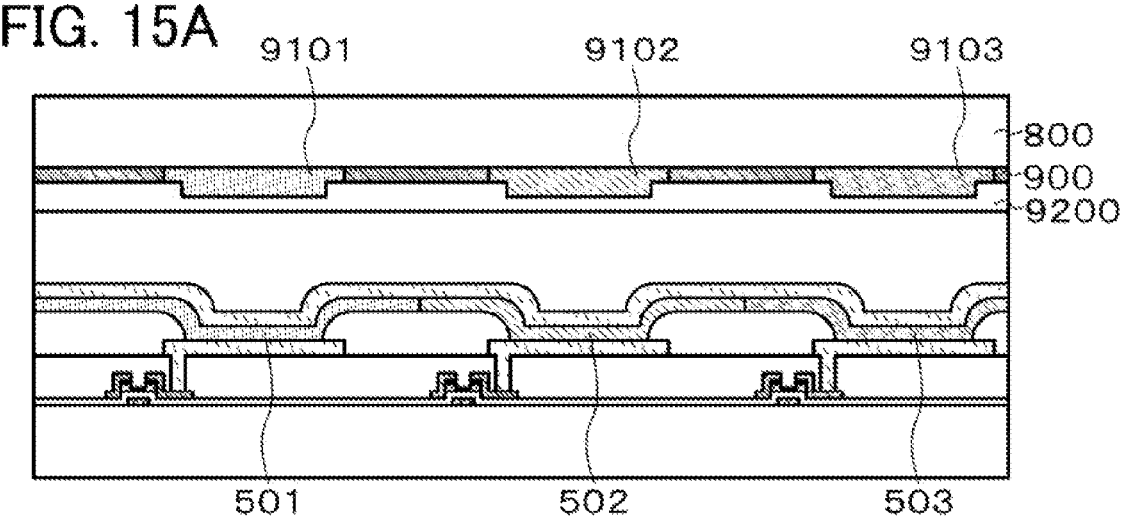
FIGS. 15A to 15C each illustrate an example of an EL display device.
Figure 15B:
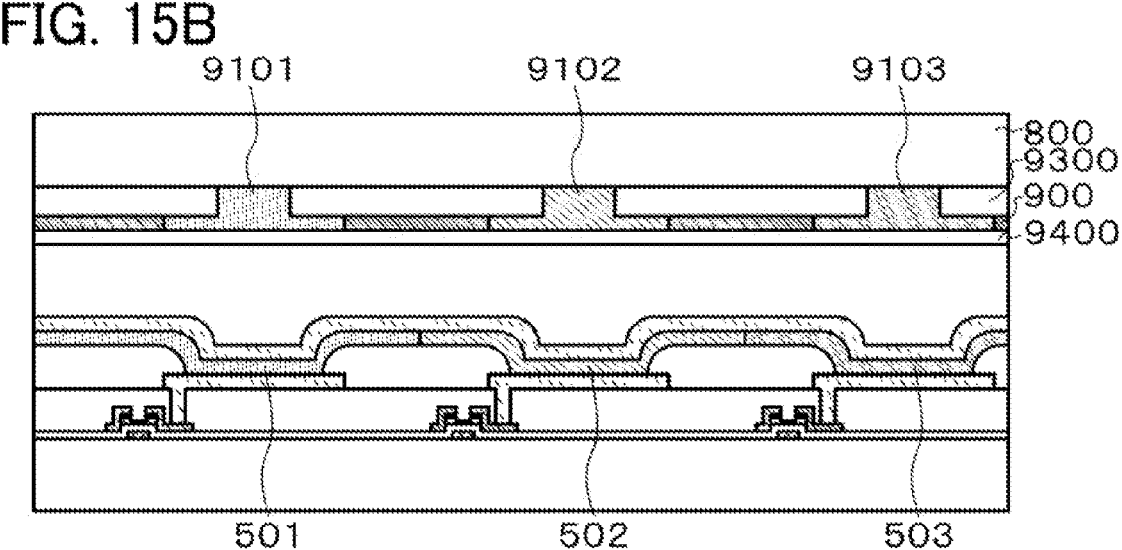
Figure 15C:
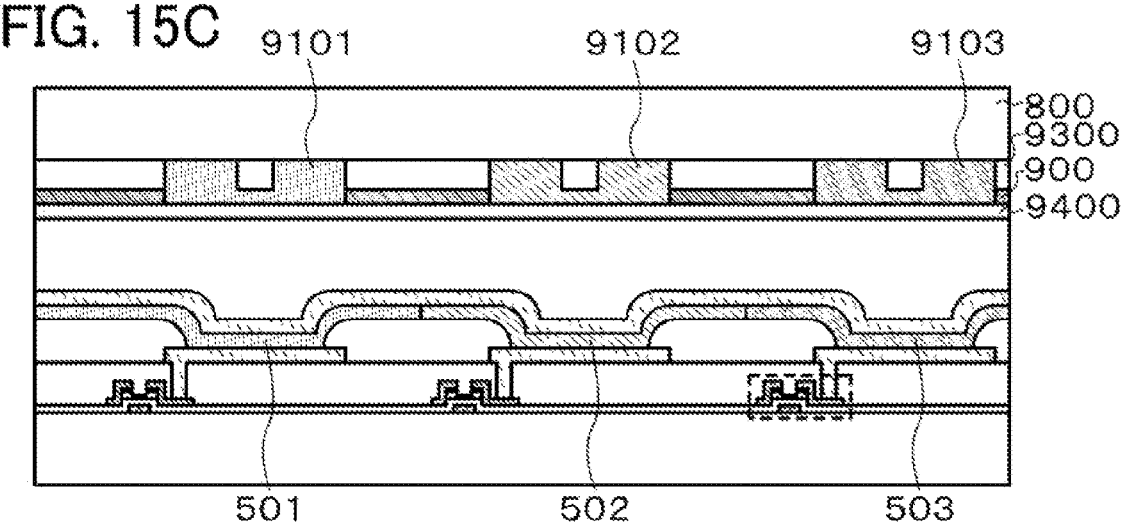

FIGS. 15A to 15C correspond to FIGS. 13A to 13C, respectively.

In FIGS. 12A to 12C and FIGS. 13A to 13C, a light-emitting element which emits white light is used, while in FIGS. 14A to 14C and FIGS. 15A to 15C, a light-emitting element, the emission color of which is a similar color to the color filter, is used. FIGS. 12A to 12C and FIGS. 13A to 13C are different from and FIGS. 14A to 14C and FIGS. 15A to 15C at this point.

Note that "similar color" means that hue in three attributes of color (hue, saturation, and value) is the same.

On the other hand, "different color" means hue in three attributes of color (hue, saturation, and value) is different.

Further, "complementary color" means pairs of colors that are of opposite in hue circle.

Specifically, an electroluminescence layer 501 which emits red light is provided in a position corresponding to the red color filter 9101.

An electroluminescence layer 502 which emits green light is provided in a position corresponding to the green color filter 9102.

An electroluminescence layer 503 which emits blue light is provided in a position corresponding to the blue color filter 9103.

In FIGS. 12A to 12C and FIGS. 13A to 13C, light passing through the transmissive region is white light; however, in FIGS. 14A to 14C and FIGS. 15A to 15C, light passing through the transmissive region and the color of the color filter are similar colors, whereby, purity of light passing through the transmissive region can be improved.

Because color purity of the light passing through the transmissive region can be improved, color purity of a pixel can be improved.

This embodiment can be implemented in combination with any of the other embodiments as appropriate.

Embodiment 10

In FIGS. 12A to 12C, FIGS. 13A to 13C, FIGS. 14A to 14C, and FIGS. 15A to 15C, a color conversion unit is provided on the counter substrate side; however, the color conversion unit may be provided on the element substrate side as shown in FIGS. 16A to 16C, FIGS. 17A to 17C, and FIGS. 18A to 18C, and FIGS. 19A to 19C.

Figure 16A:
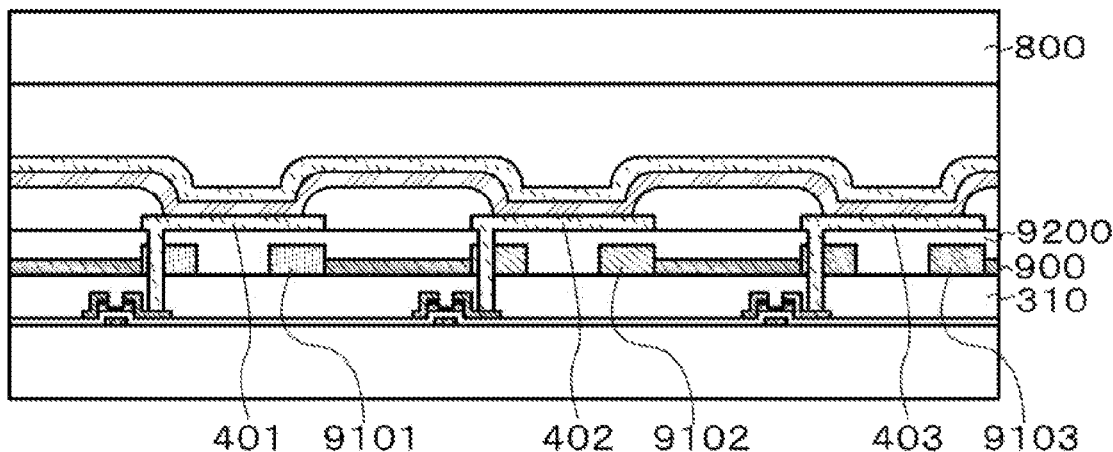
FIGS. 16A to 16C each illustrate an example of an EL display device.
Figure 16B:
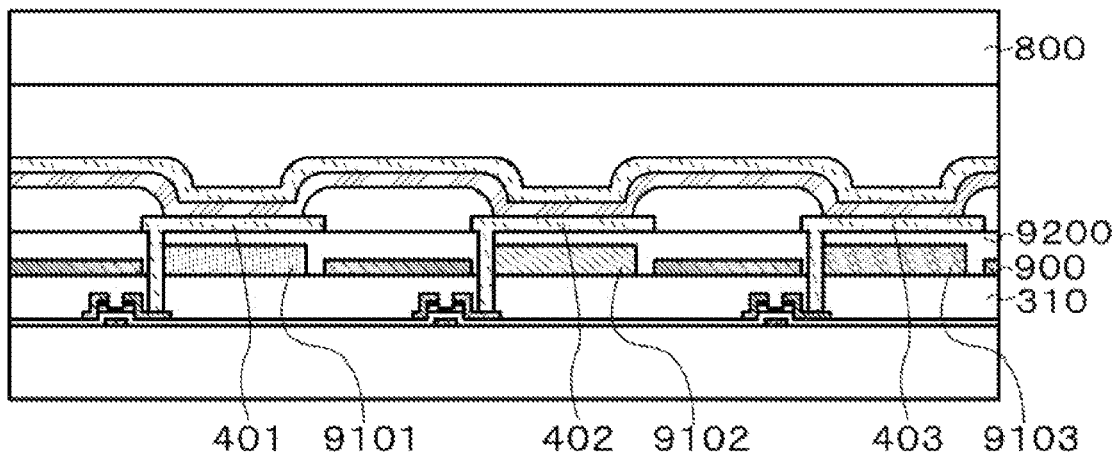
Figure 16C:
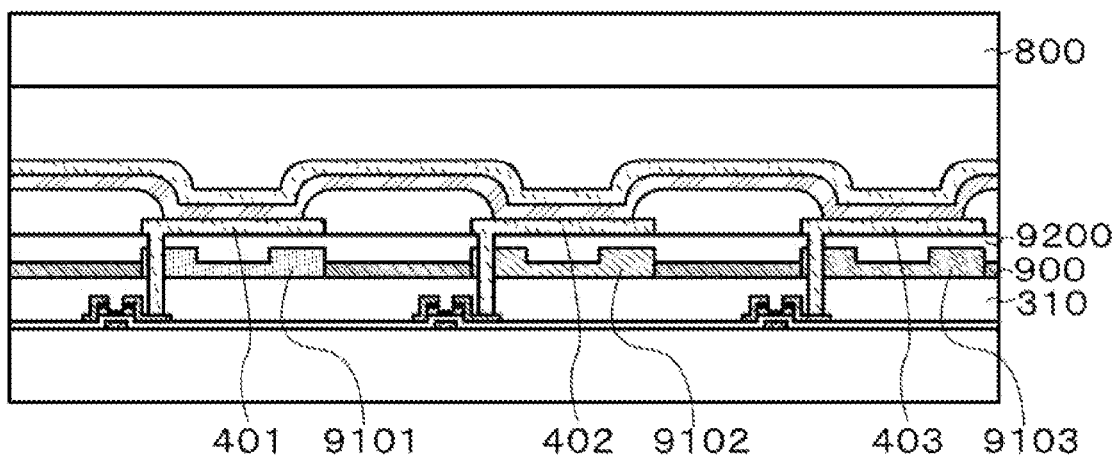

FIGS. 16A to 16C correspond to FIGS. 12A to 12C, respectively.

Figure 17A:
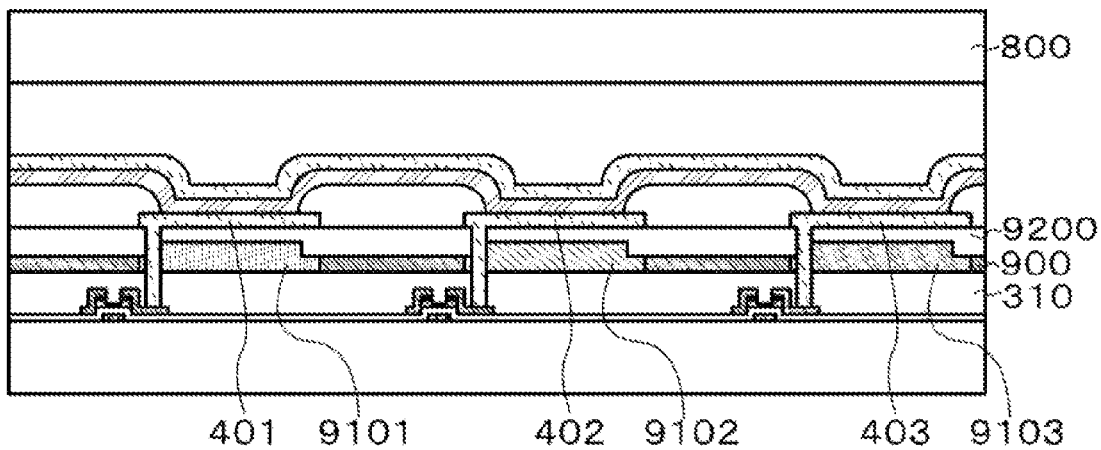
FIGS. 17A to 17C each illustrate an example of an EL display device.
Figure 17B:
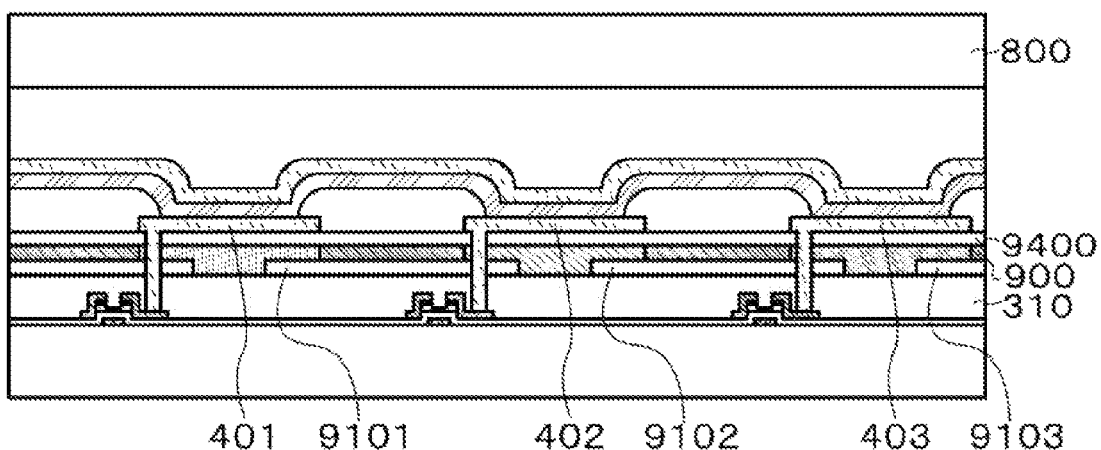
Figure 17C:
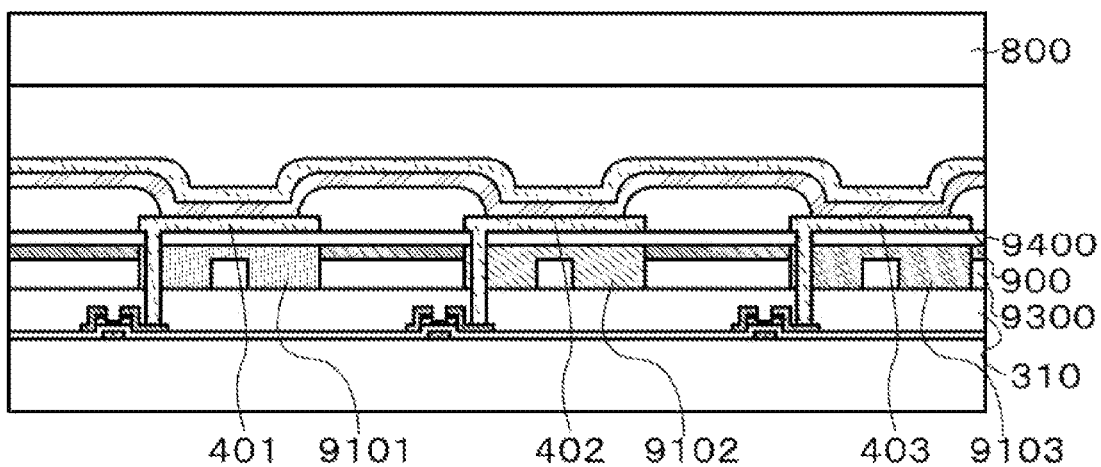

FIGS. 17A to 17C correspond to FIGS. 13A to 13C, respectively.

Figure 18A:
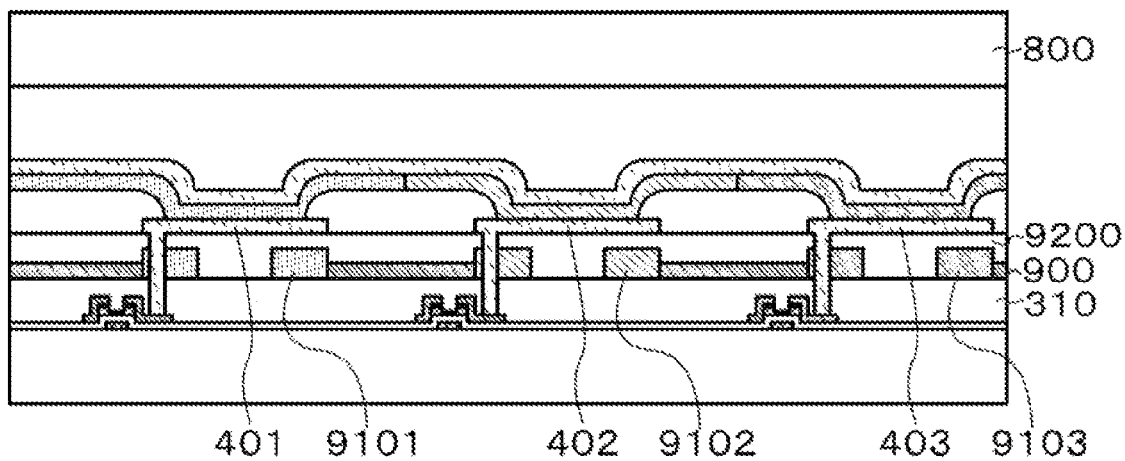
FIGS. 18A to 18C each illustrate an example of an EL display device.
Figure 18B:
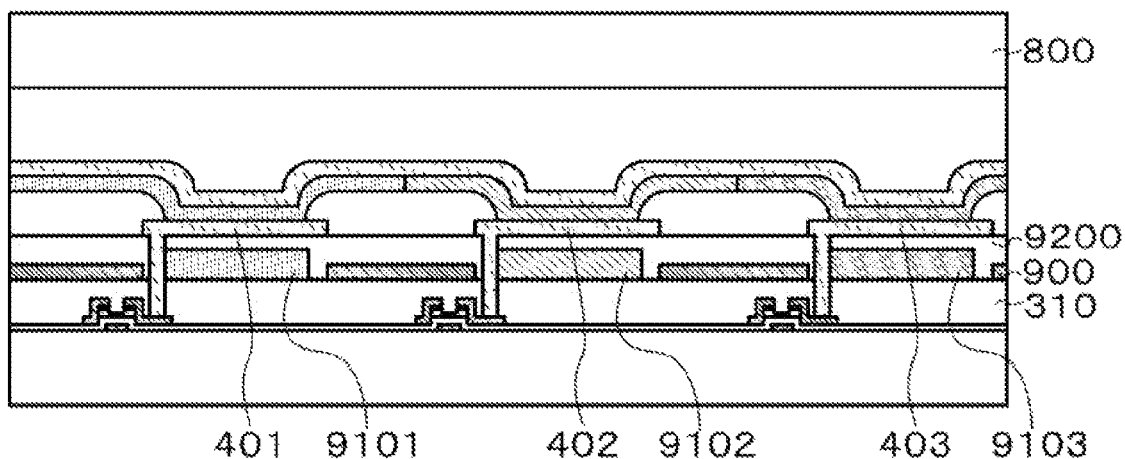
Figure 18C:
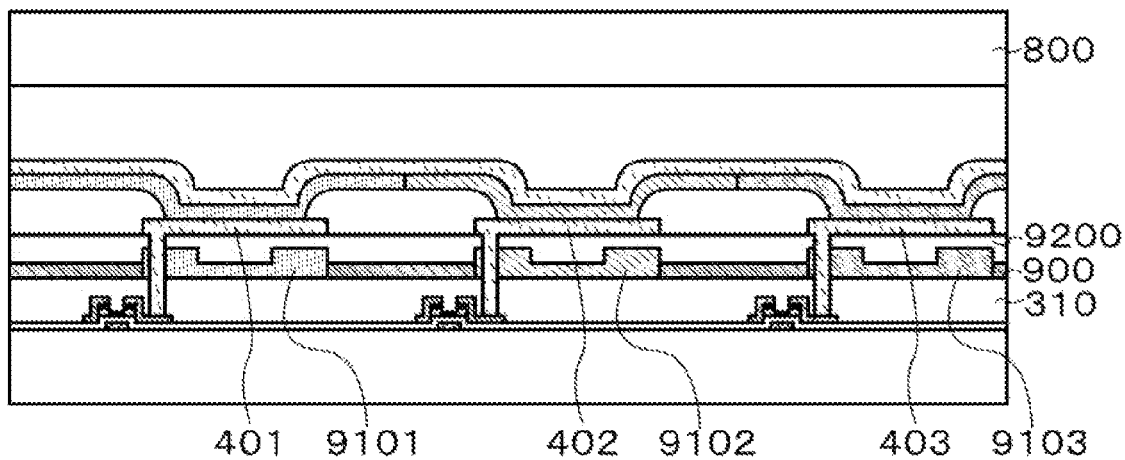

FIGS. 18A to 18C correspond to FIGS. 14A to 14C, respectively.

Figure 19A:
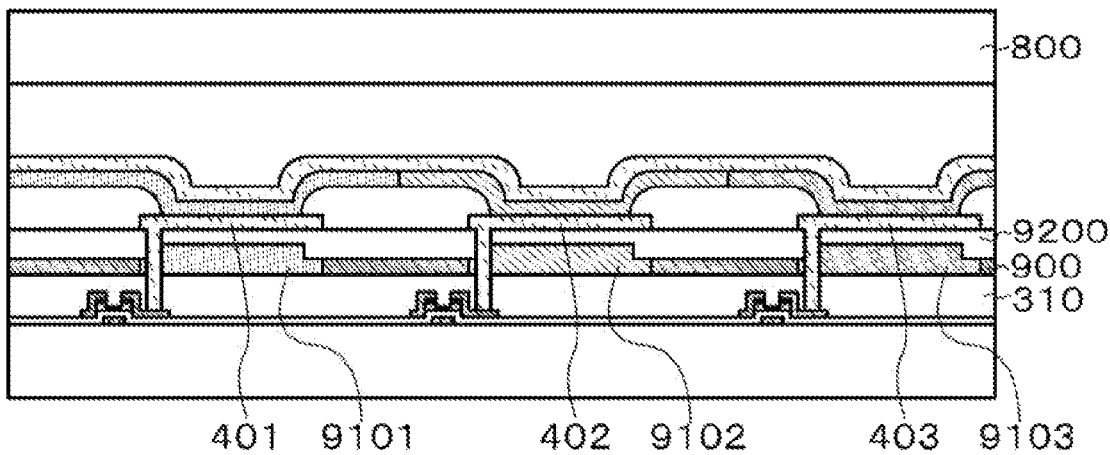
FIGS. 19A to 19C each illustrate an example of an EL display device.
Figure 19B:
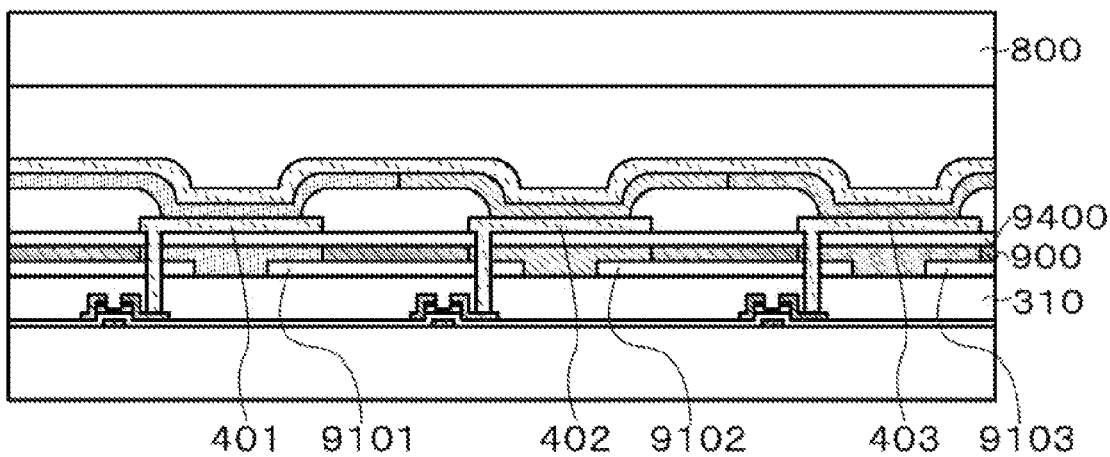
Figure 19C:
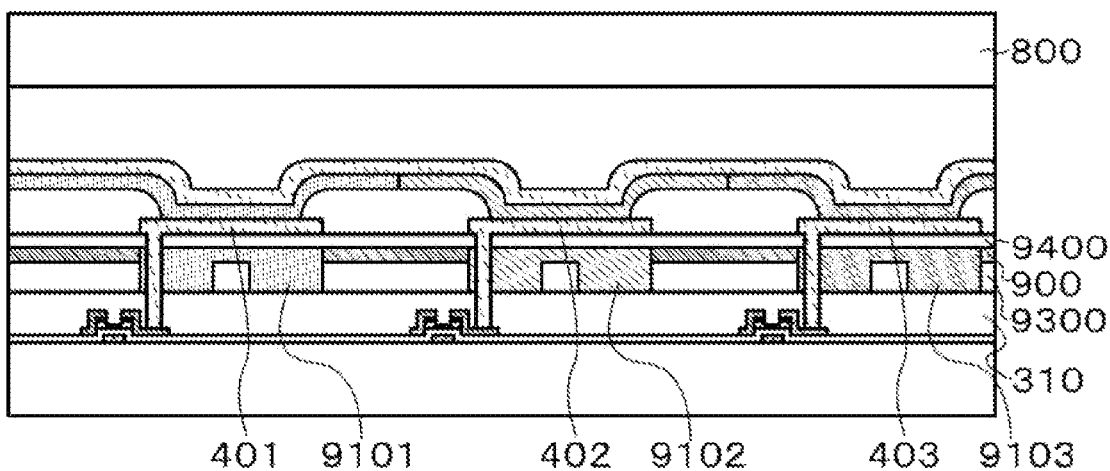

FIGS. 19A to 19C correspond to FIGS. 15A to 15C, respectively.

This embodiment can be implemented in combination with any of the other embodiments as appropriate.

Embodiment 11

FIGS. 20A to 20C, FIGS. 21A to 21C, FIGS. 22A to 22C, FIGS. 23A to 23C, FIGS. 24A to 24C, FIGS. 23A to 25C, FIGS. 26A to 26C, and FIGS. 27A to 27C each illustrate examples of liquid crystal display devices corresponding to those in FIGS. 12A to 12C, FIGS. 13A to 13C, FIGS. 16A to 16C, and FIGS. 17A to 17C.

Figure 20A:
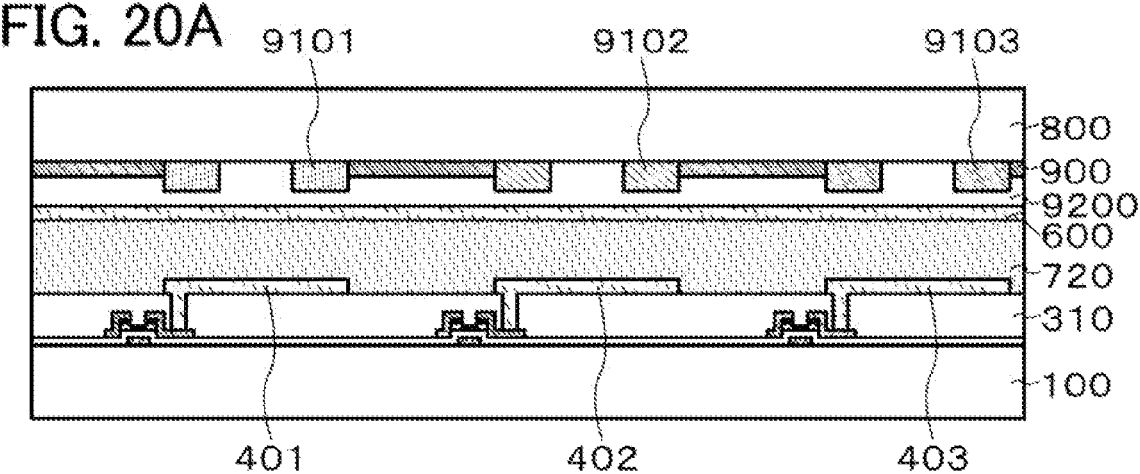
FIGS. 20A to 20C each illustrate an example of a liquid crystal display device.
Figure 20B:
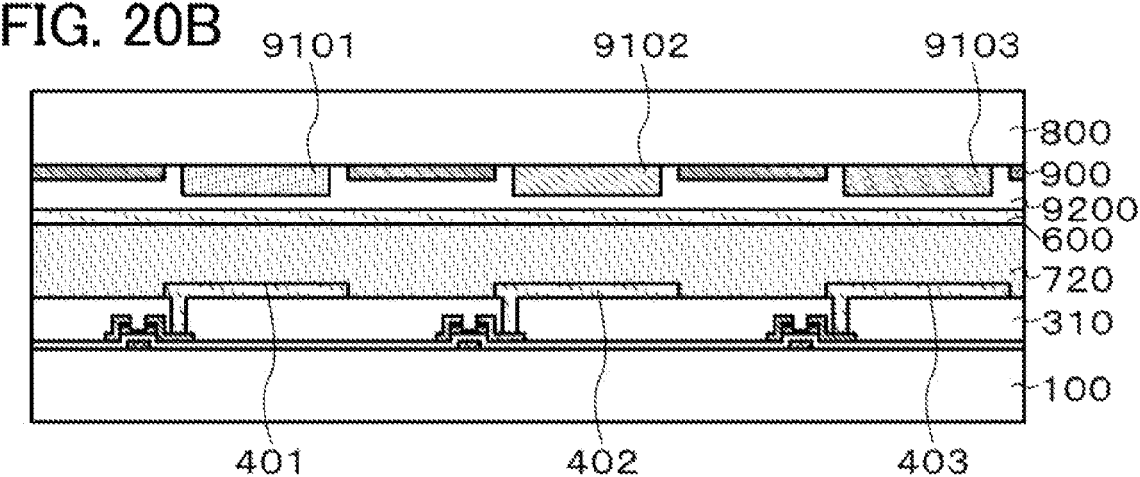
Figure 20C:
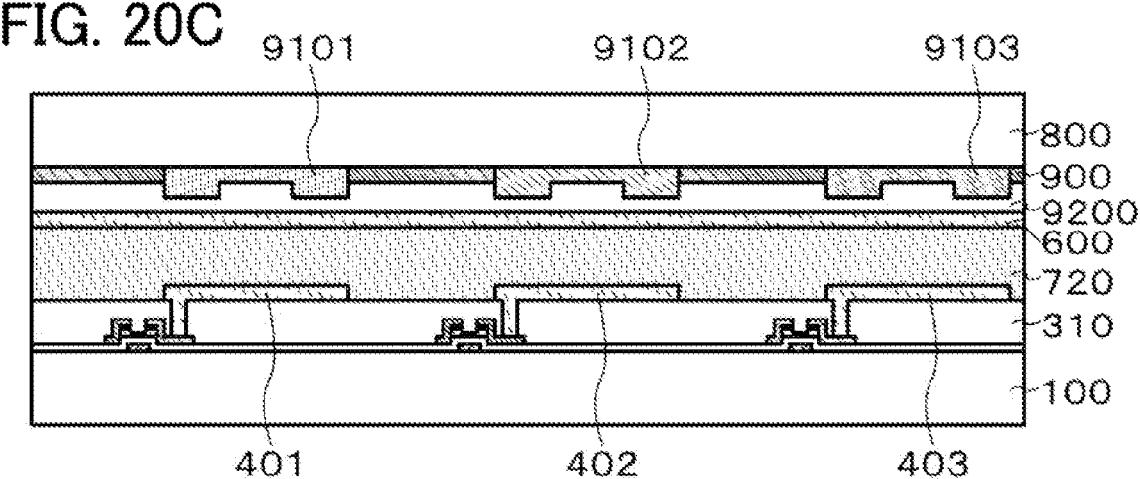

Note that FIGS. 20A to 20C correspond to FIGS. 12A to 12C, respectively.

Figure 21A:
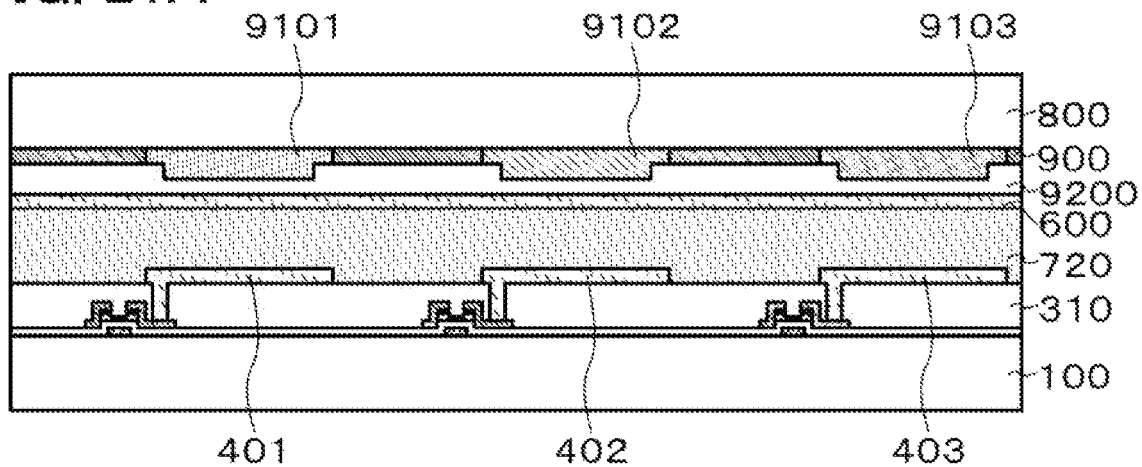
FIGS. 21A to 21C each illustrate an example of a liquid crystal display device.
Figure 21B:
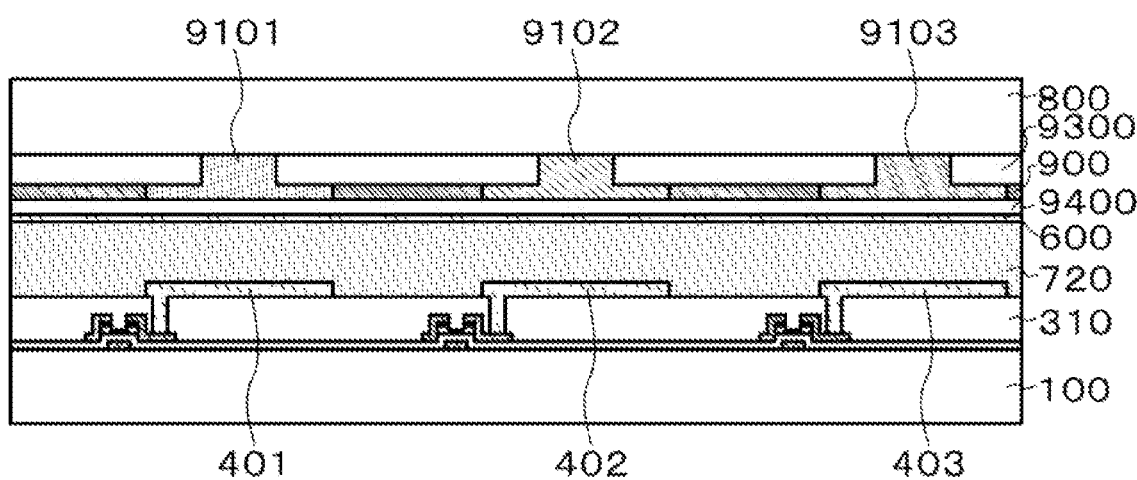
Figure 21C:
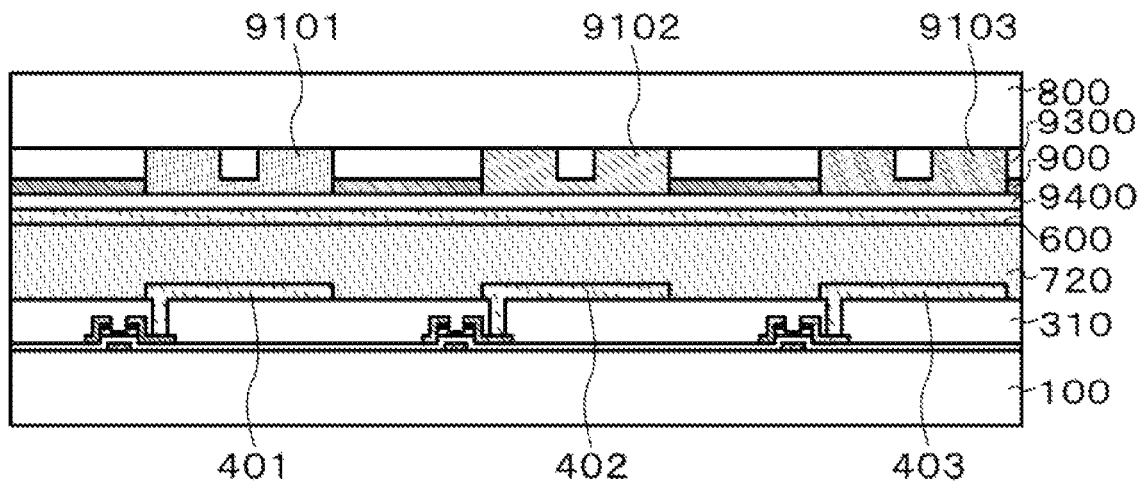

FIGS. 21A to 21C correspond to FIGS. 13A to 13C, respectively.

Figure 22A:
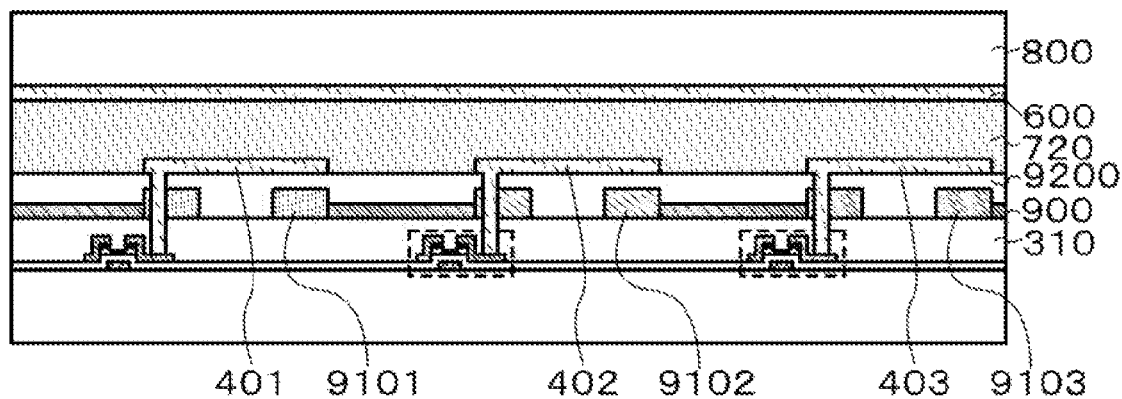
FIGS. 22A to 22C each illustrate an example of a liquid crystal display device.
Figure 22B:
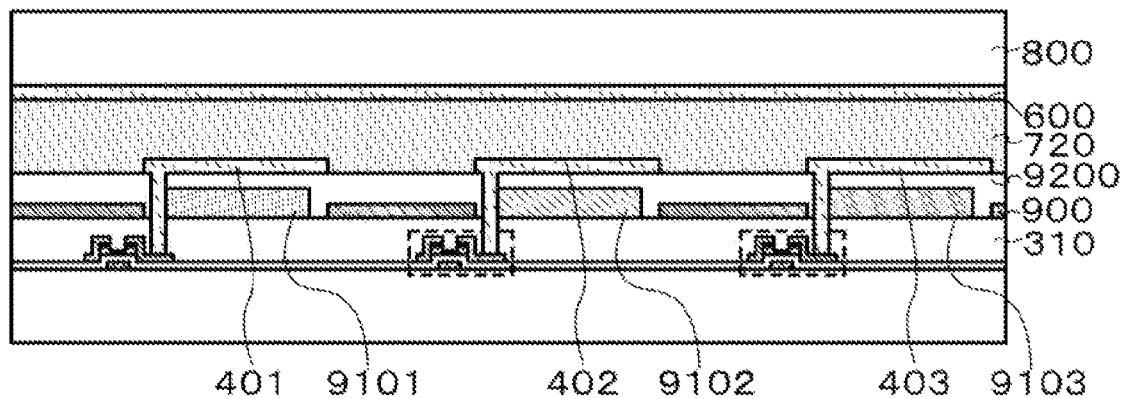
Figure 22C:
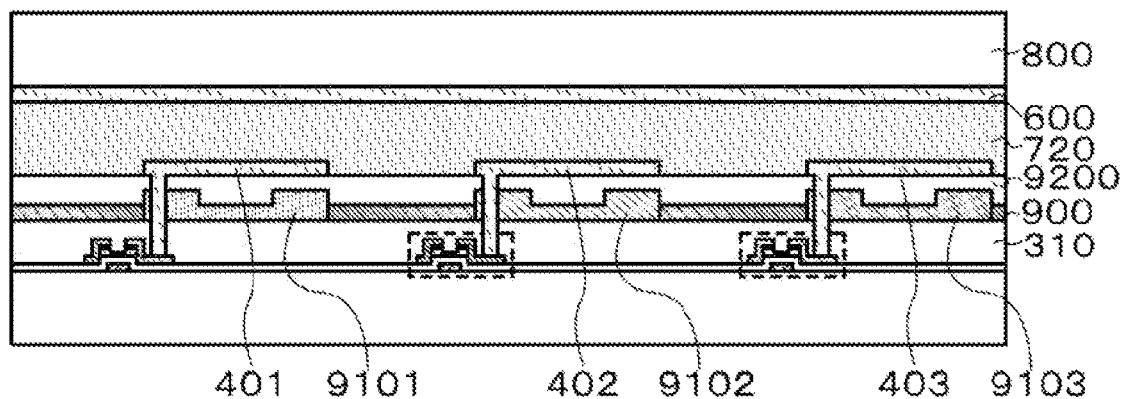

FIGS. 22A to 22C correspond to FIGS. 16A to 16C, respectively.

Figure 23A:
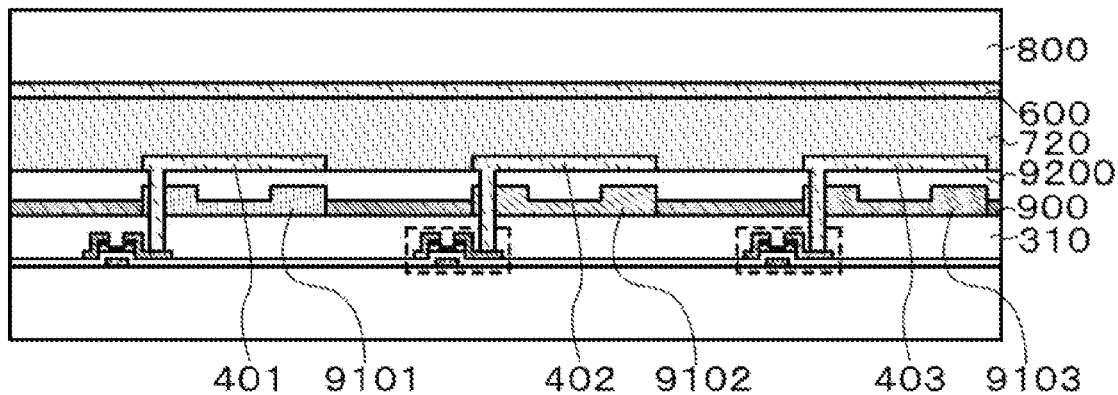
FIGS. 23A to 23C each illustrate an example of a liquid crystal display device.
Figure 23B:
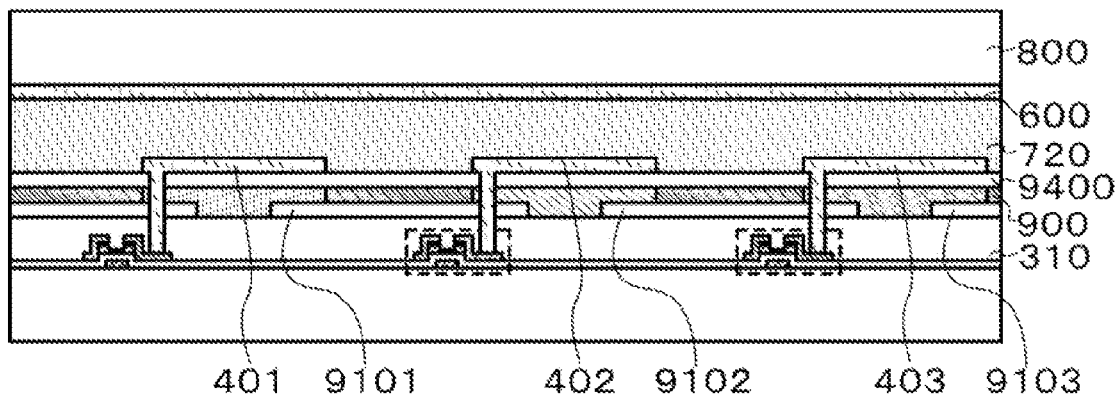
Figure 23C:
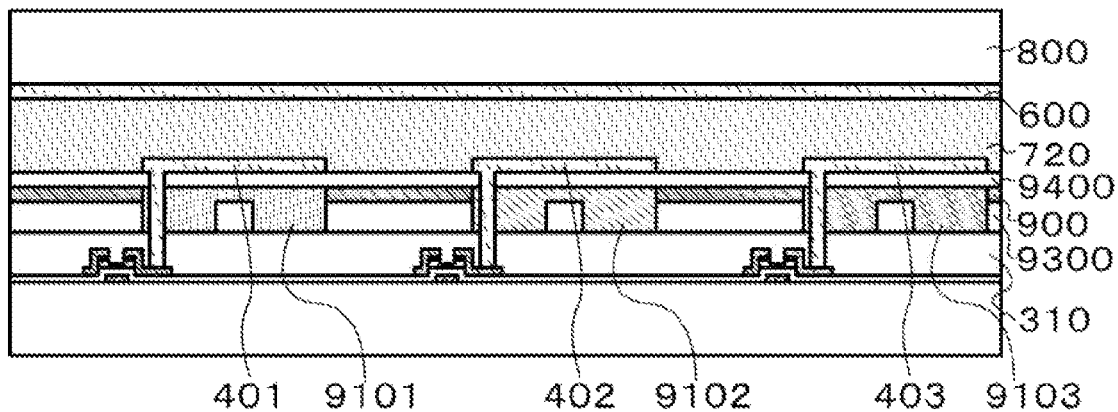

FIGS. 23A to 23C correspond to FIGS. 17A to 17C, respectively.

In FIGS. 20A to 20C, FIGS. 21A to 21C, FIGS. 22A to 22C, and FIGS. 23A to 23C, a liquid crystal layer 720 is used instead of the insulating film 320 and the electroluminescence layer 500 which are used in FIGS. 12A to 12C and FIGS. 13A to 13C, and FIGS. 16A to 16C and FIGS. 17A to 17C.

Further, the tipper electrode 600 is formed on the counter substrate side.

Note that an alignment film is preferably formed on each of the lower electrode surface and the upper electrode surface.

Figure 24A:
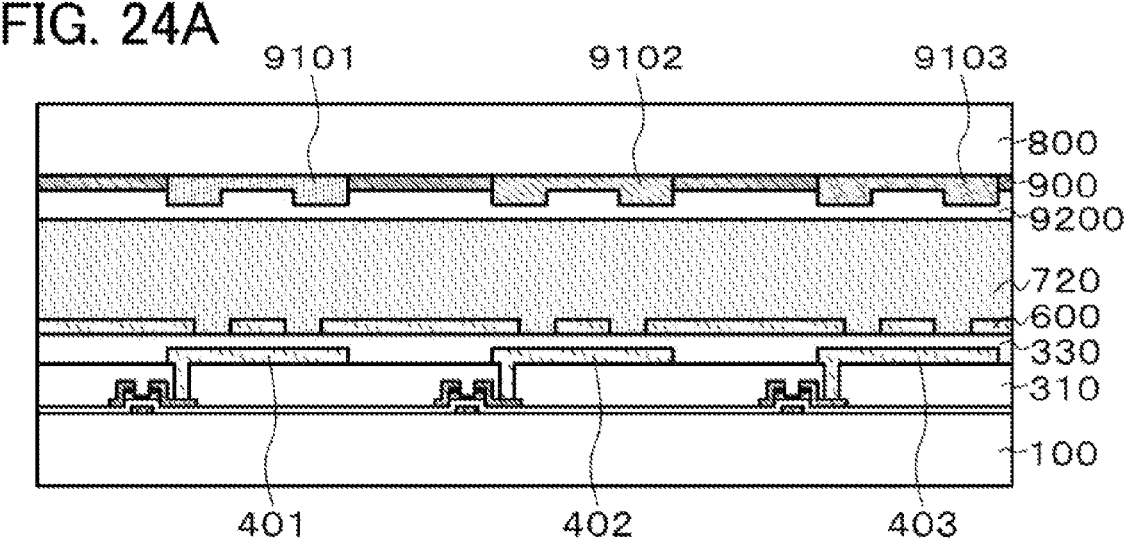
FIGS. 24A to 24C each illustrate an example of a liquid crystal display device.
Figure 24B:
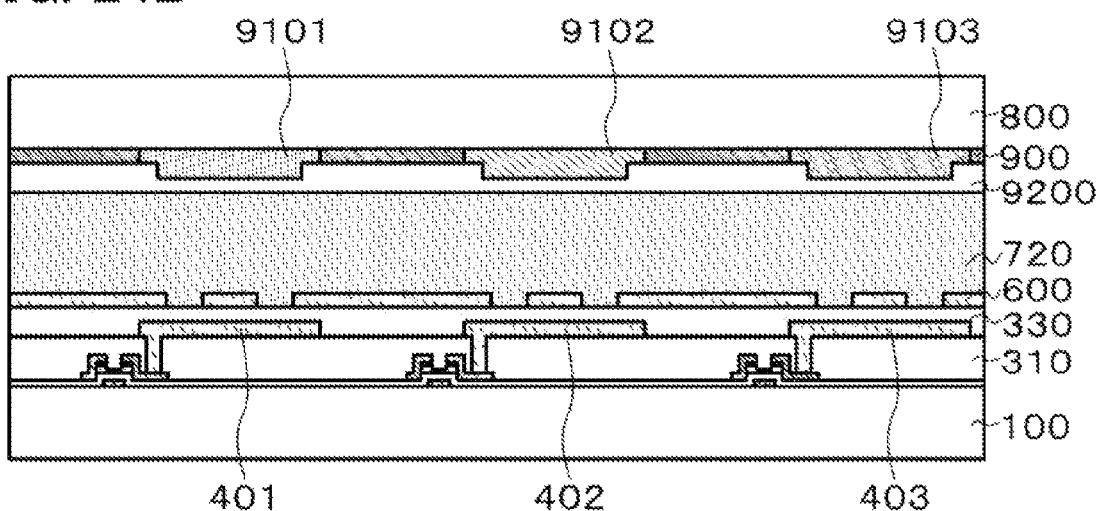
Figure 24C:
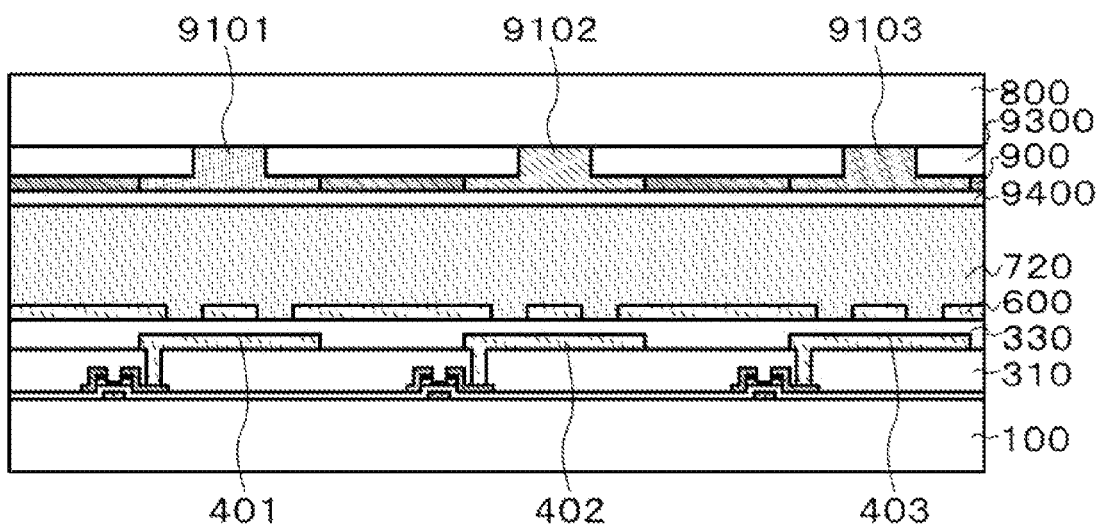

FIGS. 24A to 24C correspond to FIGS. 12A to 12C, respectively.

Figure 25A:
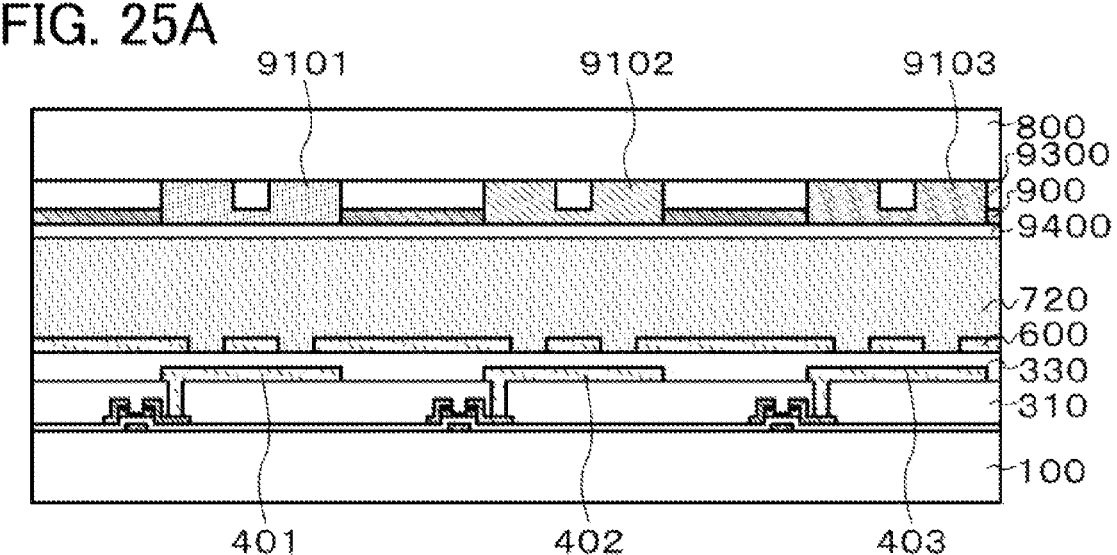
FIGS. 25A to 25C each illustrate an example of a liquid crystal display device.
Figure 25B:
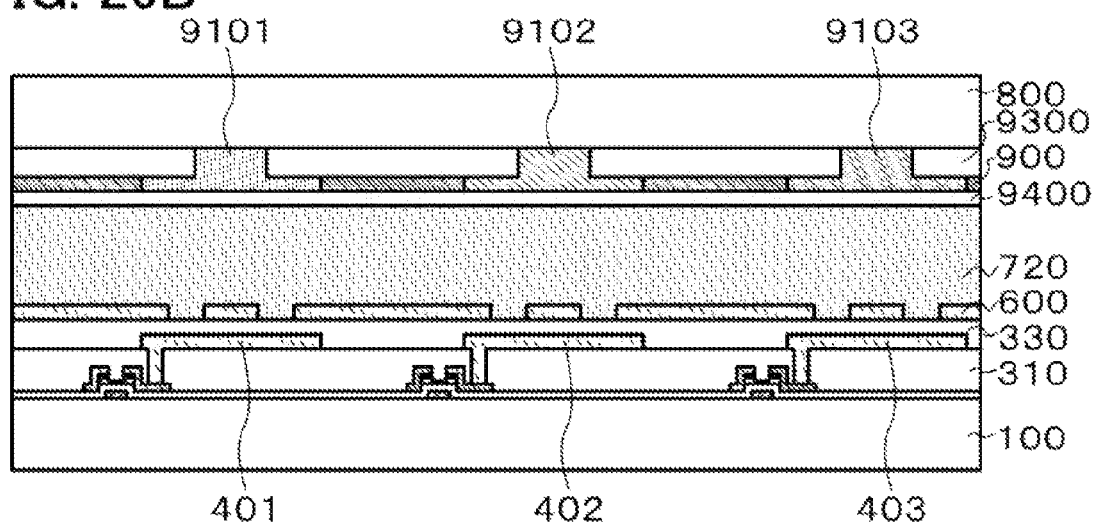
Figure 25C:
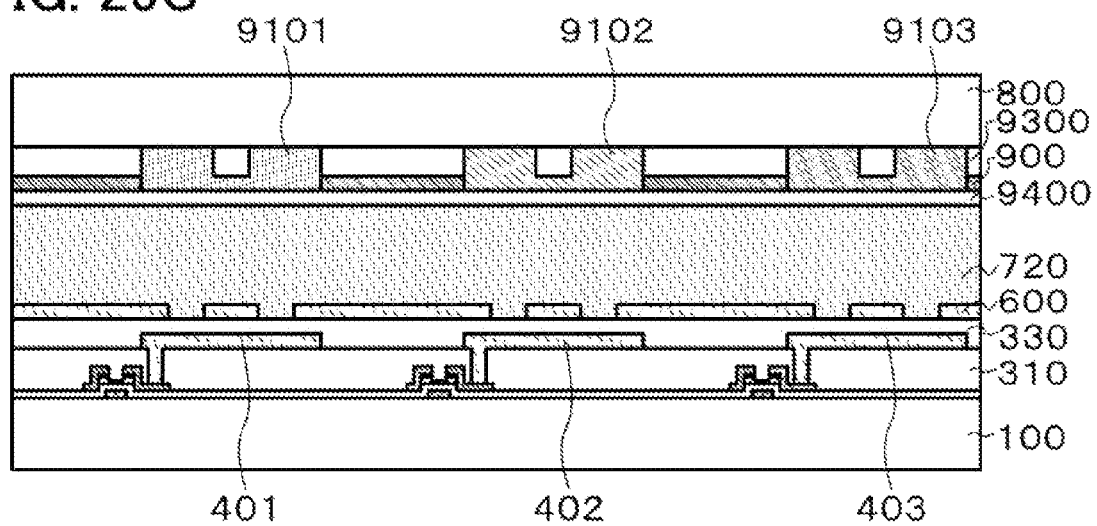

FIGS. 25A to 25C correspond to FIGS. 13A to 13C, respectively.

Figure 26A:
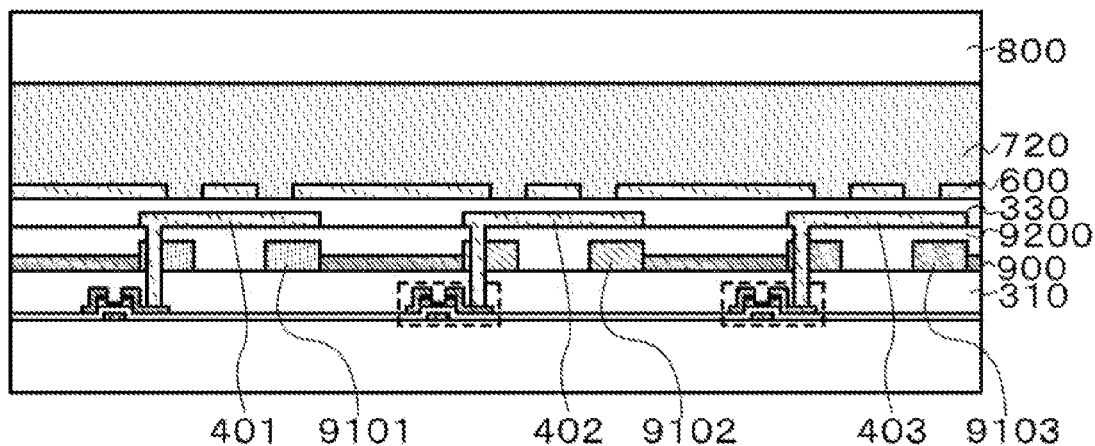
FIGS. 26A to 26C each illustrate an example of a liquid crystal display device.
Figure 26B:
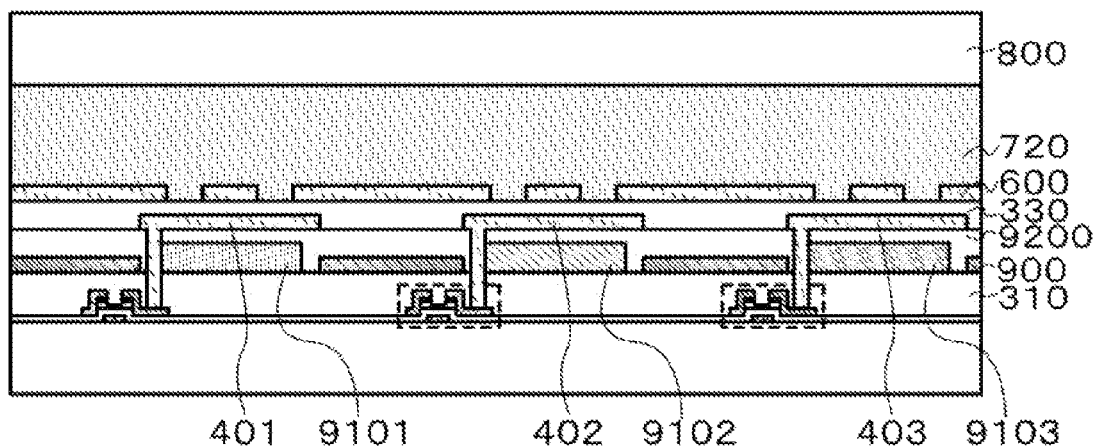
Figure 26C:
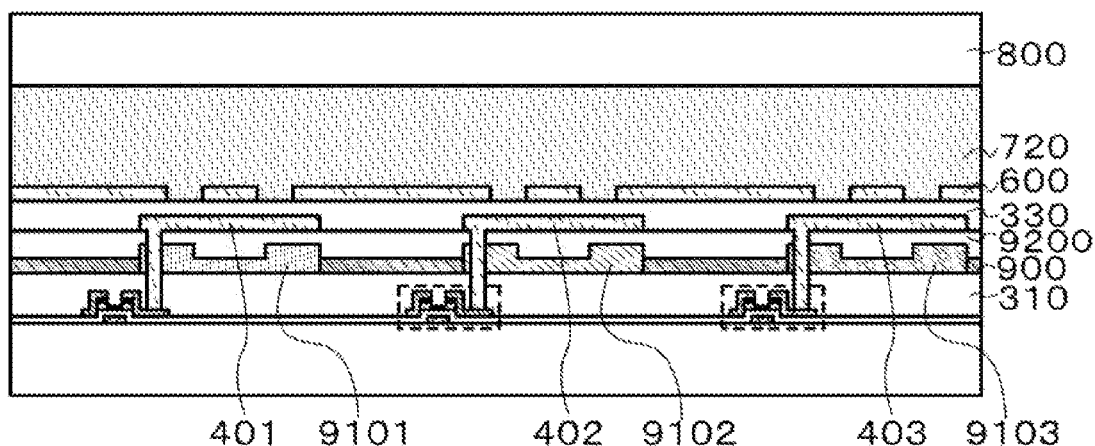

FIGS. 26A to 26C correspond to FIGS. 16A to 16C, respectively.

Figure 27A:
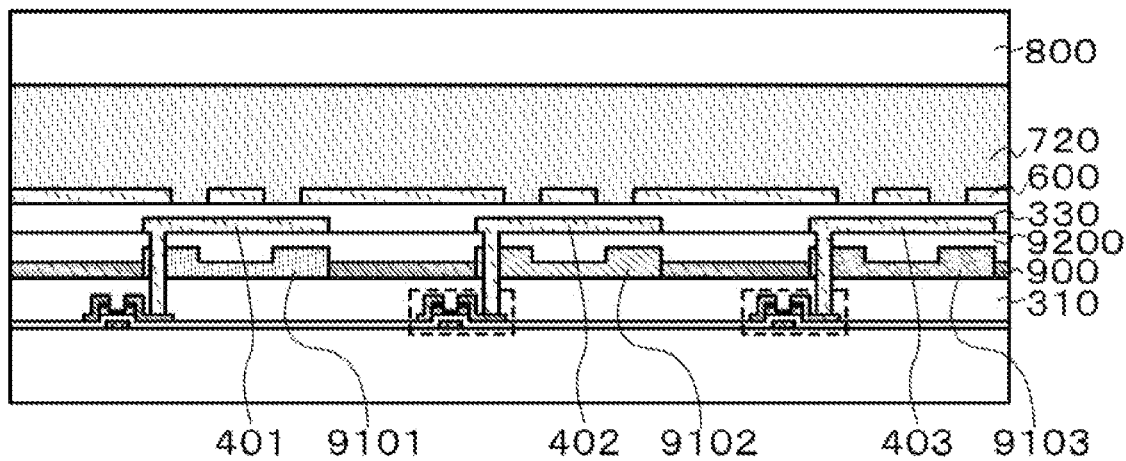
FIGS. 27A to 27C each illustrate an example of a liquid crystal display device.

FIGS. 27A to 26C correspond to FIGS. 17A to 17C, respectively.

In FIGS. 24A to 24C, FIGS. 25A to 25C, FIGS. 26A to 26C, and FIGS. 27A to 27C, a liquid crystal layer 720 is used instead of the insulating film 320 and the electroluminescence layer 500 which are used in FIGS. 12A to 12C and FIGS. 13A to 13C, and FIGS. 16A to 16C and FIGS. 17A to 17C.

In FIGS. 24A to 24C, FIGS. 25A to 25C, FIGS. 26A to 26C, and FIGS. 27A to 27C, an insulating film 330 is formed over the lower electrode and the upper electrode 600 is formed over the insulating film 330.

A plurality of slits is provided in part of the upper electrode 600 overlapping with the lower electrode.

The method shown in FIGS. 24A to 24C, FIGS. 25A to 25C, FIGS. 26A to 26C, and FIGS. 27A to 27C is a so-called a fringe field switching (FFS) method, in which with a plurality of slits provided, liquid crystal molecules in a liquid crystal layer are arranged by generation of a horizontal electric field between the upper electrode and the lower electrode.

Note that an alignment film is preferably provided on the upper electrode surface.

The positions of the upper electrode and the lower electrode may be reversed.

Further, an in plane switching (IPS) liquid crystal display device may be manufactured by forming the upper electrode and the lower electrode over the same insulating surface.

Here, the surface of the color conversion unit is preferably made flat, because a problem of disclination due to an uneven surface of a color conversion unit can be solved.

As the color conversion unit having a flat surface, for example, any of the color conversion units shown in FIGS. 6A to 6C, FIGS. 7A to 7C, and FIGS. 8A to 8C is preferably used.

The liquid crystal element is formed using the lower electrode, the liquid crystal layer, and the upper electrode in FIGS. 20A to 20C, FIGS. 21A to 21C, FIGS. 22A to 22C, FIGS. 23A to 23C, FIGS. 24A to 24C, FIGS. 25A to 25C, FIGS. 26A to 26C, and FIGS. 27A to 27C.

This embodiment can be implemented in continuation with any of the other embodiments as appropriate.

Embodiment 12

By replacement of the electroluminescence layer 500 in each of FIGS. 12A to 12C, FIGS. 13A to 13C, FIGS. 16A to 16C, and FIGS. 17A to 17 with an electrochromic layer or the like, an electrochromic display device having an electrochromic element formed using an lower electrode, an electrochromic layer, and an upper electrode can be formed.

This embodiment can be implemented in combination with any of the other embodiments as appropriate.

Embodiment 13

By replacement of the liquid crystal layer 720 in each of FIGS. 20A to 20C, FIGS. 21A to 21C, FIGS. 22A to 22C, and FIGS. 23A to 23C with an electrophoretic microcapsule or the like, an electrophoretic display device having an electrophoretic element including a lower electrode, a microcapsule, and an upper electrode can be formed.

This embodiment can be implemented in combination with any of the other embodiments as appropriate.

Embodiment 14

FIGS. 12A to 12C, FIGS. 13A to 13C, FIGS. 14A to 14C, FIG. 15A to 15C, FIGS. 16A to 16C, FIGS. 17A to 17C, FIGS. 18A to 18C, FIGS. 19A to 19C, FIGS. 20A to 20C, FIGS. 21A to 21C, FIGS. 22A to 22C, FIGS. 23A to 23C, FIGS. 24A to 24C, FIGS. 25A to 25C, FIGS. 26A to 26C, and FIGS. 27A to 27C each illustrates an active matrix display device using a color conversion unit; however, a color conversion unit may be used for a passive matrix display device.

For example, a passive matrix display device can be manufactured in the following manner: in FIGS. 12A to 12C, FIGS. 13A to 13C, FIGS. 14A to 14C, FIG. 15A to 15C, FIGS. 16A to 16C, FIGS. 17A to 17C, FIGS. 18A to 18C, FIGS. 19A to 19C, FIGS. 20A to 20C, FIGS. 21A to 21C, FIGS. 22A to 22C, FIGS. 23A to 23C, FIGS. 24A to 24C, FIGS. 25A to 25C, FIGS. 26A to 26C, and FIGS. 27A to 27C, a switching element is not provided, a lower electrode and an upper electrode are each formed its stripes, and the lower electrode and the upper electrode are provided so as to intersect with each other.

This embodiment can be implemented in combination with any of the other embodiments as appropriate.

Embodiment 15

In this embodiment, a structure for particularly achieving the second object to disclose a novel lighting device is described.

Figure 28A:
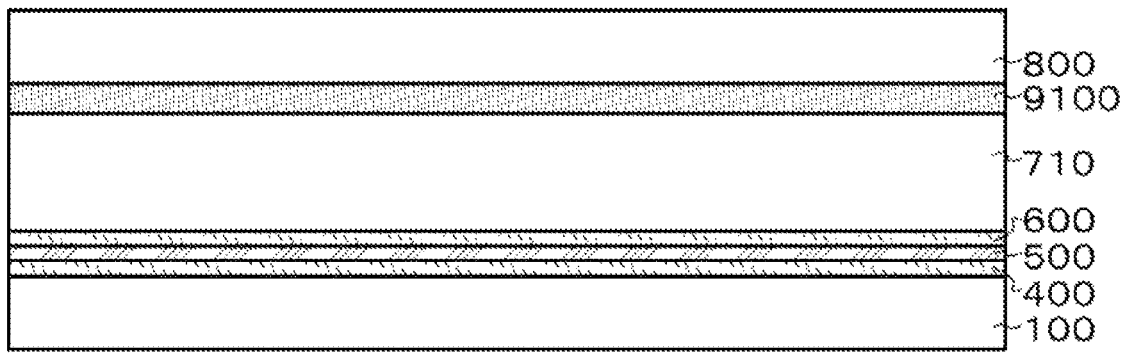
FIGS. 28A to 28C each illustrate an example of a lighting device.

FIG. 28A illustrates an example of a lighting device.

The lighting device in FIG. 28A includes an element substrate in which a lower electrode 400, the electroluminescence layer 500, and the upper electrode 600 are sequentially stacked in this order over the first substrate 100.

Further, the lighting device in FIG. 28A has a counter substrate in which a color conversion unit having a color filter 9100 is formed over the second substrate.

In the lighting device shown in FIG. 28A, the surface (top surface) of the element substrate is provided so as to face the surface (top surface) of the counter substrate with the space 710 provided therebetween.

A material for the lighting device in FIG. 28A can be similar to that used in FIG. 12A.

A transmissive region is not provided for the color filter 9100 in FIG. 28A.

A conventional lighting device which emits light having a desired color has been manufactured by selecting a material for a light-emitting element with attention paid to an emission color.

However, there has been a problem in that when a material for a light-emitting element is selected with attention paid to an emission color, there might be only a material with low luminance, a material with a short life, or the like depending on the color to be selected.

Thus, with light having a desired color is obtained in such a manner that a material having high luminance, a ling life, and the like is selected regardless of its emission color and that a color filter is used, the above problem can be solved.

Specifically, a lighting device provided with a color filter as shown in FIG. 28A is preferable.

The emission color of the light-emitting element and the color of the color filter are preferably different colors.

Note that the emission color of the light-emitting element and the color of the color filter may be in a relation of complementary colors.

Here, red, green, and blue electroluminescence materials have been developed with the purpose of achieving a full-color display device; however, there has been a problem in that the blue electroluminescence material particularly has short life.

Further, while the development of red, green, and blue electroluminescence materials has been advanced, yellow to orange electroluminescence materials have been secondarily developed.

It is difficult to use yellow to orange electroluminescence materials in a display device; however, there exist some yellow to orange electroluminescence materials having higher luminance or having longer life than other materials.

Thus, for example, by using yellow to orange light-emitting materials for an electroluminescence layer and using a color filter having a color different from the emission color of the light-emitting material, colors other than yellow to orange color may be obtained.

When a light-emitting element which emits white light has high luminance, long life, and the like, color is easily adjusted by using a color filter with a desired color.

Further, in the case of red light to be obtained, when a light-emitting element which emits red light has high luminance, long life, and the like, color purity can be improved by using a red color filter.

That is, the emission color of a light-emitting element and the color of a color filter may be similar colors.

By the structure shown in FIG. 28A, the second object can be achieved.

Figure 28B:
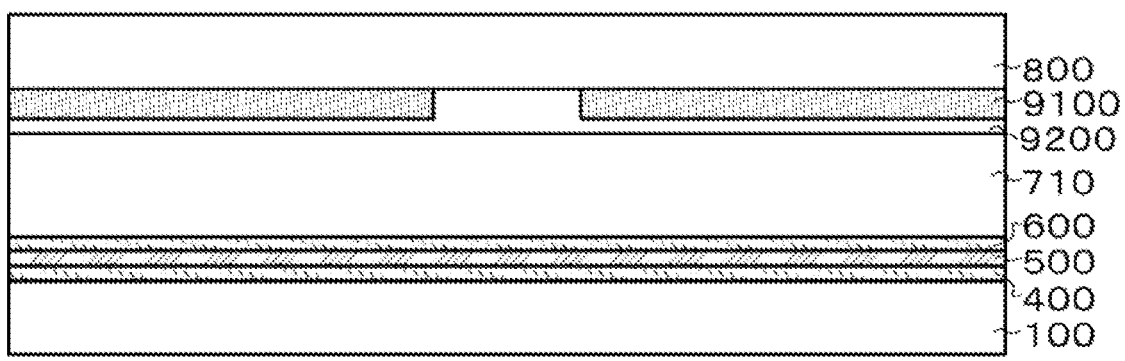

Further, FIG. 28B illustrates an example of the case where the color filter in FIG. 28A is replaced with the color conversion unit shown in FIG. 6B.

Figure 28C:
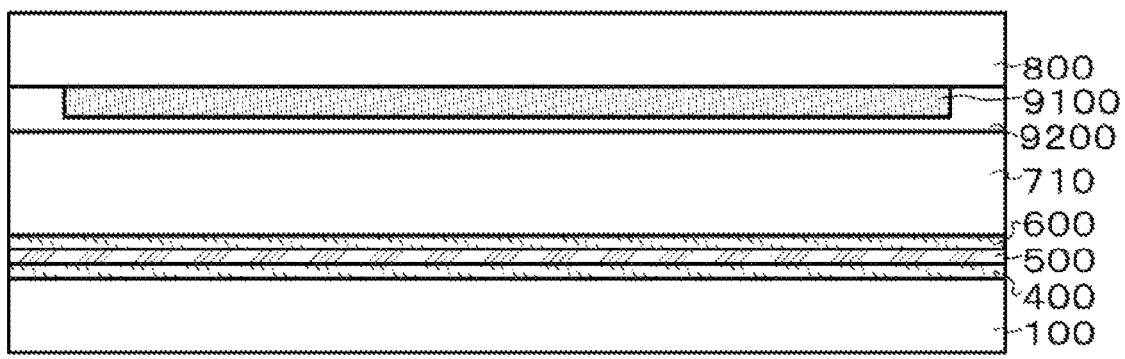

FIG. 28C illustrates an example of the case where the color filter in FIG. 28A is replaced with the color conversion unit shown in FIG. 6C.

Figure 29A:
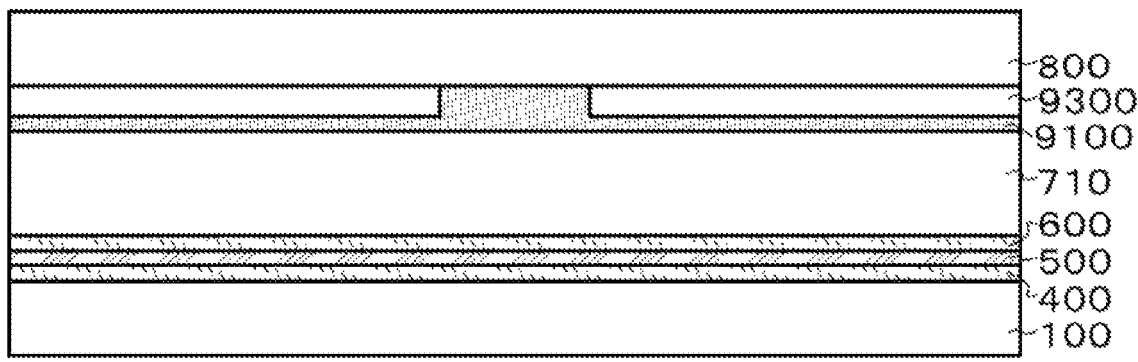
FIGS. 29A and 29B each illustrate an example of a lighting device.

FIG. 29A illustrates an example of the case where the color filter in FIG. 28A is replaced with the color conversion unit shown in FIG. 7B.

Figure 29B:
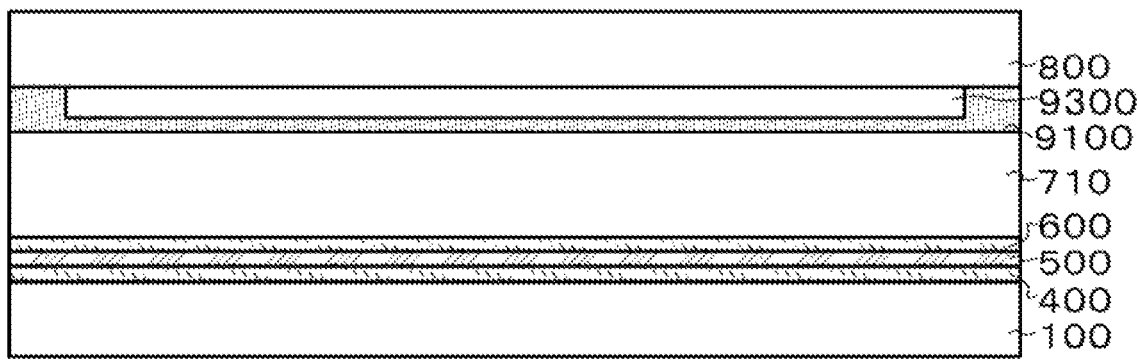

FIG. 29B illustrates an example of the case where the color filter in FIG. 28A is replaced with the color conversion unit shown in FIG. 8B.

It is preferable to provide a transmissive region in a color conversion unit as shown in FIGS. 28B and 28C, FIGS. 29A and 29B, and the like because the first object to improve luminance of light extracted outside can be achieved.

The color conversion unit is provided for the counter substrate side in FIGS. 28A and 28C, FIGS. 29A and 29B; however, the color conversion unit may be provided for the element substrate side as shown in FIGS. 30A to 30C and FIGS. 31A and 31B.

Figure 30A:
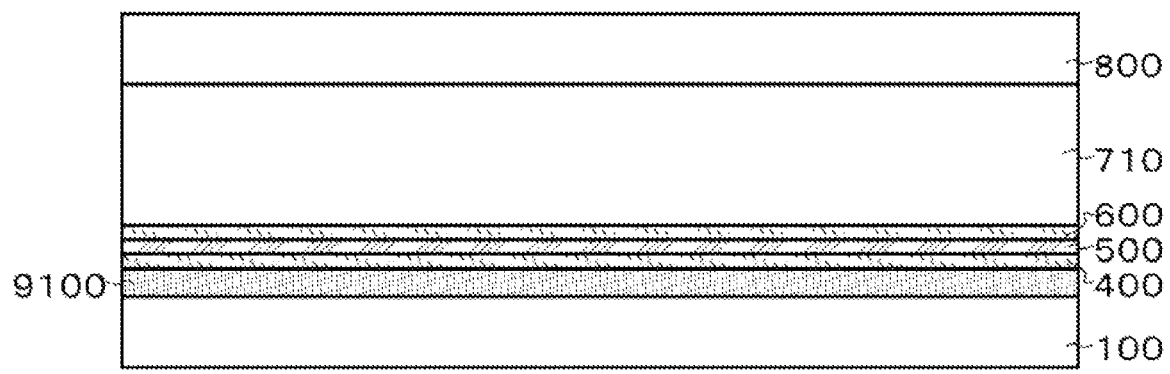
FIGS. 30A to 30C each illustrate an example of a lighting device.
Figure 30B:
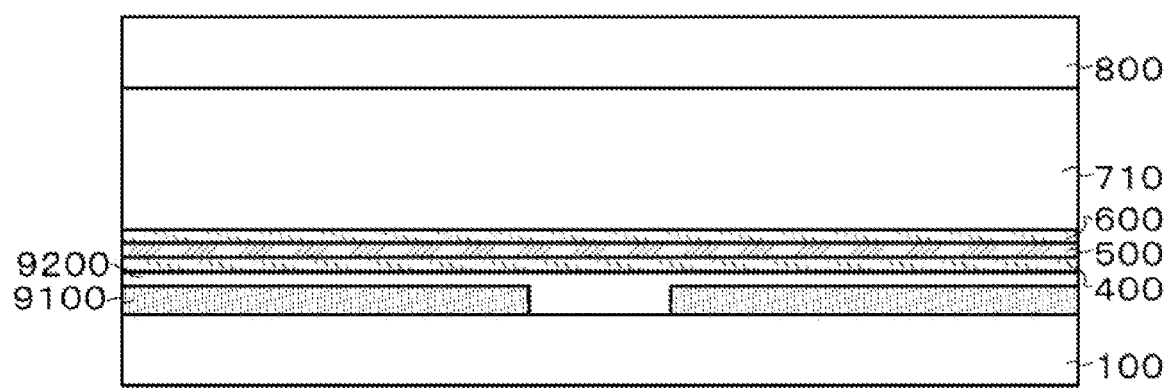
Figure 30C:
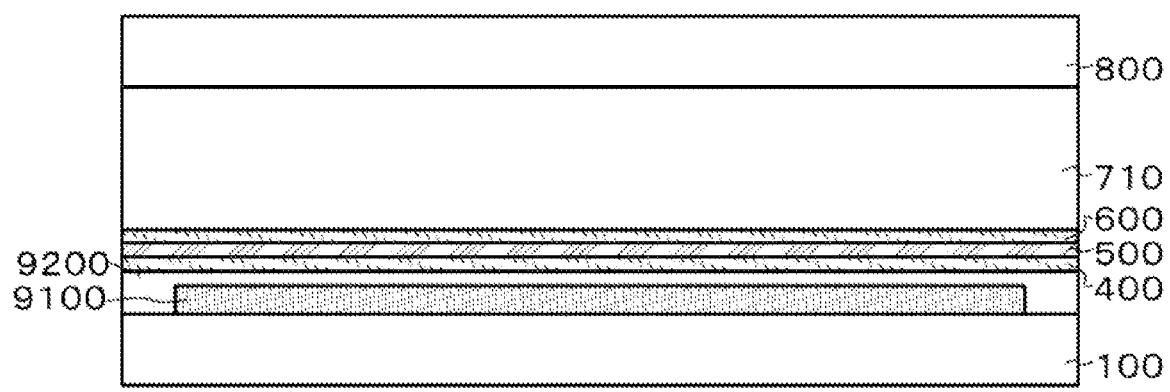
Figure 31A:
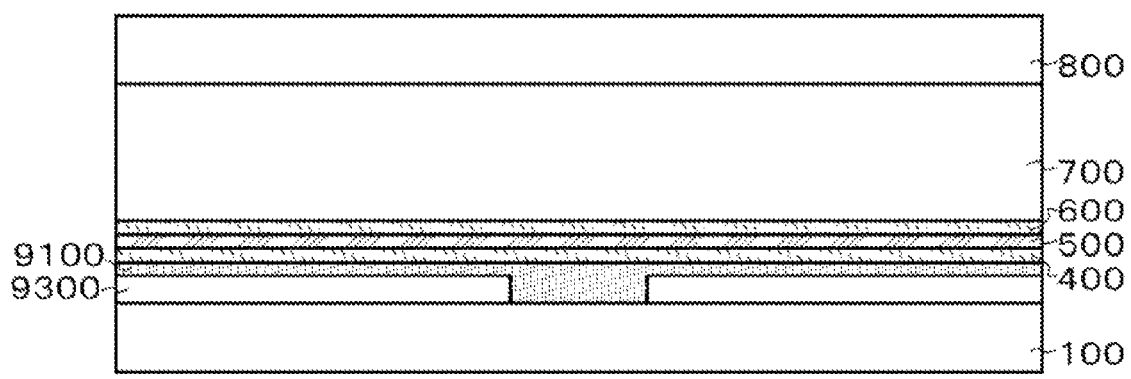
FIGS. 31A and 31B each illustrate an example of a lighting device.
Figure 31B:
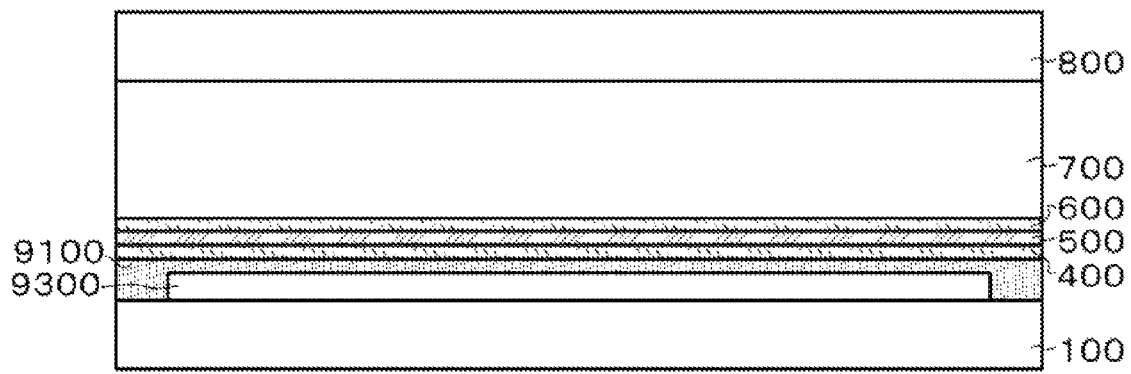

FIG. 30A is an example corresponding to FIG. 28A.
FIG. 30B is an example corresponding to FIG. 28B.
FIG. 30C is an example corresponding to FIG. 28C.
FIG. 31A is an example corresponding to FIG. 29A.
FIG. 31B is an example corresponding to FIG. 29B.

In this embodiment, description is made on the case where there is only one light-emitting element; however, a plurality of light-emitting elements may be provided.

By the arrangement of a plurality of light-emitting elements, the following structures can be obtained; a structure in which, a plurality of light-emitting elements is connected in series; a structure in which a plurality of light-emitting elements is connected in parallel; a structure in which a plurality of light-emitting elements is connected in series and in parallel; and the like.

Further, when a plurality of light-emitting elements is provided, lighting of each light-emitting element may be independently controlled.

For example, when a plurality of light-emitting elements is provided with the structures similar to those of the display devices in FIGS. 12A to 12C, FIGS. 13A to 13C, FIGS. 14A to 14C, FIG. 15A to 15C, FIGS. 16A to 16C, FIGS. 17A to 17C, FIGS. 18A to 18C, and FIGS. 19A to 19C, lighting of each light-emitting element can be independently controlled.

That is, the structure applicable to a display device is also applicable to a lighting device.

When any of the structures shown in FIGS. 12A to 12C, FIGS. 13A to 13C, FIGS. 14A to 14C, FIG. 15A to 15C, FIGS. 16A to 16C, FIGS. 17A to 17C, FIGS. 18A to 18C, and FIGS. 19A to 19C is applied to a lighting device, the lighting device is different bent a display device in the size of an element.

The size of a display is the square of several tens of micrometers to several hundreds of micrometers, for example; on the other hand, a lighting device is the square of several millimeters to several tens of centimeters, for example.

Further, a structure of a driving circuit for controlling a light-emitting element is complex in a display device; however, a structure of a driving circuit for controlling a light-emitting element is less complex in a lighting device.

When a plurality of light-emitting elements is controlled at the same time, the plurality of light-emitting elements is regarded as one unit. Thus, a color conversion unit may be provided in common for the plurality of light-emitting elements (one color conversion unit is provided for one unit).

However, provision of a color conversion unit for each of light-emitting elements is not a problem.

When a plurality of light-emitting element is controlled independently, a color conversion unit is preferably provided for each of the light-emitting elements.

This embodiment can be implemented in combination with any of the other embodiments as appropriate.

Embodiment 16

A color conversion unit converts at least one of three attributes of color (hue, saturation, and value).

For example, when white light enters a red color filter and is converted into red light, at least hue is converted.

Further, when red light enters a red color filter so as to improve color purity, at least saturation is converted.

Further, when luminance of light is lowered, at least value is converted.

This application is based on Japanese Patent Application serial no. 2011-044741 filed with Japan Patent Office on Mar. 2, 2011, the entire contents of which are hereby incorporated by reference.

What is claimed is:

1. A display device comprising:
    a first display element;
    a second display element;
    a first color conversion unit; and
    a second color conversion unit,
        wherein the first color conversion unit is provided in a position which light radiated from the first display element enters,
        wherein the second color conversion unit is provided in a position which light radiated from the second display element enters,
        wherein the first color conversion unit includes a first color filter region and a first transmissive region,
        wherein the second color conversion unit includes a second color filter region and a second transmissive region,
        wherein transmittance per unit area of the first color filter region is lower than the transmittance per unit area of the second color filter region, and
        wherein the area of the first transmissive region is larger than the area of the second transmissive region.

2. The display device according to claim 1,
    wherein a green color filter is provided in the first color filter region.

3. The display device according to claim 1,
wherein the first color conversion unit includes a first color filter and a first insulating film covering the first color filter,
wherein the second color conversion unit includes a second color filter and a second insulating film covering the second color filter.

4. The display device according to claim 1,
wherein the first color conversion unit includes a first insulating film provided in the first transmissive region and a first color filter provided in both the first transmissive region and the first color filter region, the first color filter covering the first insulating film,
wherein the second color conversion unit includes a second insulating film provided in the second transmissive region and a second color filter provided in both the second transmissive region and the second color filter region, the second color filter covering the second insulating film, and
wherein the first color filter and the second color filter each include an organic material.

5. The display device according to claim 1,
wherein the first color conversion unit includes a first insulating film provided in the first transmissive region and a first color filter provided in both the first transmissive region and the first color filter region, the first color filter covering the first insulating film,
wherein the second color conversion unit includes a second insulating film provided in the second transmissive region and a second color filter provided in both the second transmissive region and the second color filter region, the second color filter covering the second insulating film,
wherein the first color filter and the second color filter each include an organic material,
wherein at least one of the first color filter and the first insulating film includes a plurality of light scattering particles, and
wherein at least one of the second color filter and the second insulating film includes a plurality of light scattering particles.

6. The display device according to claim 1,
wherein the first color filter region includes at least a first ring-like region, and
wherein the first ring-like region overlaps with an end portion of the first display element.

7. The display device according to claim 1,
wherein the first color filter region includes at least a first ring-like region,
wherein the first ring-like region overlaps with an end portion of the first display element,
wherein the first transmissive region includes a second ring-like region,
wherein the second ring-like region is provided adjacent to the first ring-like region and in an inner side of the first ring-like region.

8. A display device comprising
a first display element;
a second display element;
a third display element;
a first color conversion unit;
a second color conversion unit; and
a third color conversion unit,
wherein the first color conversion unit is provided in a position which light radiated from the first display element enters,
wherein the second color conversion unit is provided in a position which light radiated from the second display element enters,
wherein the third color conversion unit is provided in a position which light radiated from the third display element enters,
wherein the first color conversion unit includes a first color filter region and a first transmissive region,
wherein the second color conversion unit includes a second color filter region and a second transmissive region,
wherein the third color conversion unit includes a third color filter region and a third transmissive region,
wherein transmittance per unit area of the first color filter region is lower than the transmittance per unit area of the second color filter region,
wherein transmittance per unit area of the second color filter region is lower than the transmittance per unit area of the third color filter region,
wherein the area of the first transmissive region is larger than the area of the second transmissive region, and
wherein the area of the second transmissive region is larger than the area of the third transmissive region.

9. The display device according to claim 8,
wherein a green color filter is provided in the first color filter region.

10. The display device according to claim 8,
wherein the first color conversion unit includes a first color filter and a first insulating film covering the first color filter,
wherein the second color conversion unit includes a second color filter and a second insulating film covering the second color filter, and
wherein the third color conversion unit includes a third color filter and a third insulating film covering the third color filter.

11. The display device according to claim 8,
wherein the first color conversion unit includes a first insulating film provided in the first transmissive region, and a first color filter provided in both the first transmissive region and the first color filter region, the first color filter covering the first insulating film,
wherein the second color conversion unit includes a second insulating film provided in the second transmissive region, and a second color filter provided in both the second transmissive region and the second color filter region, the second color filter covering the second insulating film,
wherein the third color conversion unit includes a third insulating film provided in the third transmissive region, and a third color filter provided in both the third transmissive region and the third color filter region, the third color filter covering the third insulating film, and
wherein the first color filter, the second color filter and the third color filter each include an organic material.

12. The display device according to claim 8,
wherein the first to third color conversion units each include a color filter and an insulating film covering the color filter,
wherein at least one of the color filter and the insulating film includes a plurality of light scattering particles.

13. The display device according to claim 8,
wherein the first color filter region includes at least a first ring-like region, and
wherein the first ring-like region overlaps with an end portion of the first display element.

14. The display device according to claim 8,
wherein the first color filter region includes at least a first ring-like region,
wherein the first ring-like region overlaps with an end portion of the first display element,
wherein the first transmissive region includes a second ring-like region, and
wherein the second ring-like region is provided adjacent to the first ring-like region and in an inner side of the first ring-like region.

* * * * *

UNITED STATES PATENT AND TRADEMARK OFFICE
CERTIFICATE OF CORRECTION

PATENT NO. : 8,884,509 B2
APPLICATION NO. : 13/406816
DATED : November 11, 2014
INVENTOR(S) : Hideki Matsukura It is certified that error appears in the above-identified patent and that said Letters Patent is hereby corrected as shown below:

In the Specification:

Col. 1, line 32, "and organic" should read --an organic"--

Col. 1, line 47, "electrophoresis" should read --electrophoretic--

Col. 2, line 24, "filter a lighting" should read --filter, a lighting--

Col. 2, line 47, "first plurality of light" should read --first ring-like--

Col. 3, line 15, "ring-like region," should read --ring-like region--

Col. 3, line 23, "element a first" should read --element, a first--

Col. 3, line 53, "color fitter" should read --color filter--

Col. 3, line 67, "to the first" should read --in the first--

Col. 4, line 60, "a plats view" should read --a plan view--

Col. 6, line 17, "region 1120; a structure" should read --region 1120: a structure--

Col. 6, line 17, "on which" should read --in which--

Col. 6, line 26, "fitter layer" should read --filter layer--

Col. 6, line 30, "lifter region 1110" should read --filter region 1110--

Col. 7, line 19, "color filer region" should read --color filter region--

Col. 7, line 20, "shape to" should read --shape in--

Col. 7, line 31, "In each, of FIGS. 2A" should read --In each of FIGS. 2A--

Col. 7, line 64, "with, the optical element" should read --with the optical element--

Col. 8, line 1, "color fiber regions" should read --color filter regions--

Col. 8, line 4, "; thus the" should read --thus, the--

Col. 8, lines 7-8, "peripheral, portion" should read --peripheral portion--

Col. 8, line 26, "area, of the color" should read --area of the color--

Col. 8, line 30, "fitter 1110" should read --filter 1110--

Signed and Sealed this
Seventh Day of April, 2015

Michelle K. Lee
*Director of the United States Patent and Trademark Office*

CERTIFICATE OF CORRECTION (continued)
U.S. Pat. No. 8,884,509 B2

In the Specification:

Col. 9, line 3, "optical, element 1000" should read --optical element 1000--

Col. 9, line 48, "second ring tike" should read --second ring like--

Col. 9, line 59, "island-sloped color-filter" should read --island-shaped color filter--

Col. 10, line 6, "FIGS. 4 to 4D" should read --FIGS. 4A to 4D--

Col. 11, line 19, "the green," should read --the green--

Col. 11, line 45, "If is" should read --It is--

Col. 11, line 53, "if is" should read --it is--

Col. 11, line 60, "green" should read --blue--

Col. 12, line 48, "declination" should read --disclination--

Col. 13, line 2, "color fitter" should read --color filter--

Col. 13, line 4, "ring-dike" should read --ring-like--

Col. 13, line 14, "thicker than die" should read --thicker than the--

Col. 13, line 29, "declination" should read --disclination--

Col. 14, line 5, "1110" should read --1120--

Col. 15, line 31, "different front" should read --different from--.

Col. 16, line 46, "substrate" should read --substrates--

Col. 16, lines 64-65, "not limbed to" should read --not limited to--

Col. 17, lines 61-62, "in addition, to" should read --in addition to--

Col. 18, line 38, "color fibers" should read --color filters--

Col. 18, line 51, "in winch" should read --in which--

Col. 19, line 3, "made, slightly" should read --made slightly--

Col. 19, line 16, "color filler" should read --color filter--

Col. 19, line 30, "color fitter" should read --color filter--

Col. 20, line 38, "FIGS. 23A to 25C" should read --FIGS. 25A to 25C--

Col. 20, line 56, "tipper" should read --upper--

Figure 27B:
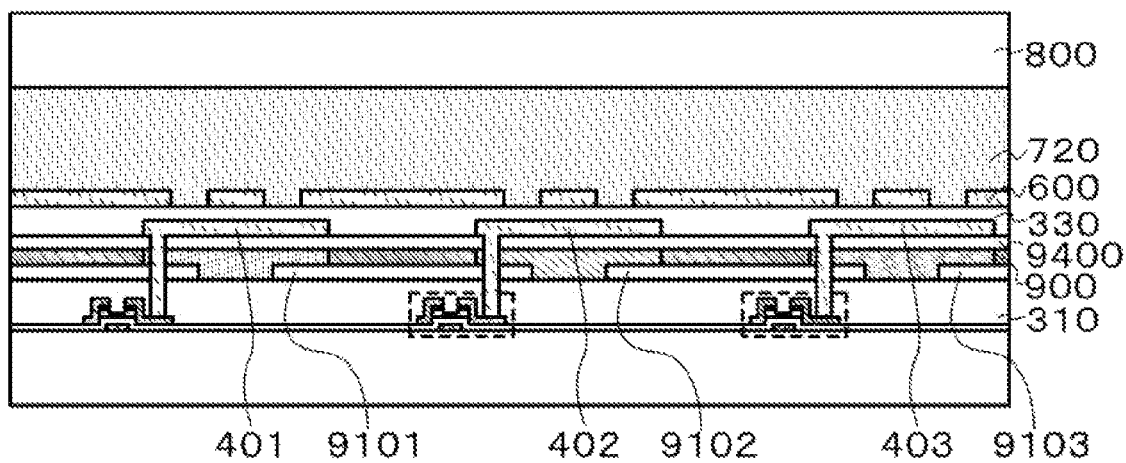
Figure 27C:
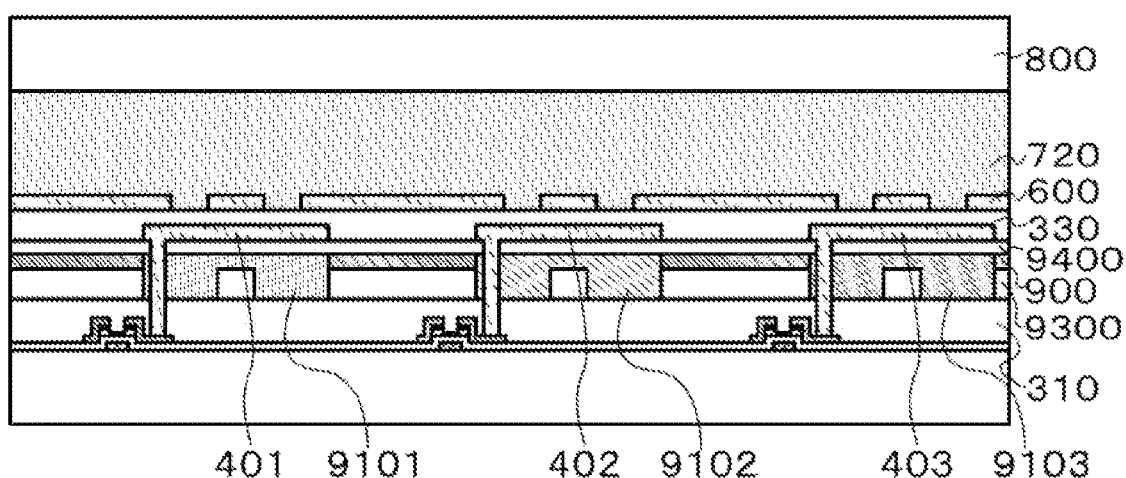

Col. 20, line 66, "FIGS. 27A to 26C" should read --FIGS. 27A to 27C--

Col. 21, line 36, "continuation" should read --combination--

Col. 22, line 12, "its stripes" should read --in stripes--

Col. 22, line 48, "with light having" should read --when light having--

Col. 22, line 49, "a ling life" should read --a long life--

Col. 23, line 38, "FIGS. 28A and 28C" should read --FIGS. 28A to 28C--

Col. 23, line 51, "obtained; a" should read --obtained: a--

Col. 23, line 52, "which, a plurality of" should read --which a plurality of--

CERTIFICATE OF CORRECTION (continued)
U.S. Pat. No. 8,884,509 B2

In the Specification:

Col. 24, line 5, "different bent" should read --different from--

Col. 24, line 7, "display is" should read --display element is--